(12) United States Patent
Jung et al.

(10) Patent No.: US 12,506,379 B2
(45) Date of Patent: Dec. 23, 2025

(54) MOTOR AND STATOR BUSBAR

(71) Applicant: LG INNOTEK CO., LTD., Seoul (KR)

(72) Inventors: Young Hwan Jung, Seoul (KR); Se Jong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 547 days.

(21) Appl. No.: 17/904,885

(22) PCT Filed: Jan. 26, 2021

(86) PCT No.: PCT/KR2021/001016
§ 371 (c)(1),
(2) Date: Aug. 24, 2022

(87) PCT Pub. No.: WO2021/172770
PCT Pub. Date: Sep. 2, 2021

(65) Prior Publication Data
US 2023/0024882 A1 Jan. 26, 2023

(30) Foreign Application Priority Data

Feb. 24, 2020 (KR) ........................ 10-2020-0022316
Mar. 18, 2020 (KR) ........................ 10-2020-0033328

(51) Int. Cl.
*H02K 3/52* (2006.01)

(52) U.S. Cl.
CPC ......... *H02K 3/522* (2013.01); *H02K 2203/09* (2013.01)

(58) Field of Classification Search
CPC .... H02K 3/522; H02K 2203/09; H02K 5/225; H02K 2213/12; H02K 5/22

(Continued)

(56) References Cited

U.S. PATENT DOCUMENTS

2012/0112582 A1* 5/2012 Kim ..................... B62D 5/0403
310/71
2012/0319512 A1* 12/2012 Nakagawa ............. H02K 1/278
310/71

(Continued)

FOREIGN PATENT DOCUMENTS

DE 11 2017 004 062 T5 4/2019
GB 2522962 A 8/2015

(Continued)

OTHER PUBLICATIONS

European Search Report dated Feb. 26, 2024 in European Application No. 21760383.6.

(Continued)

*Primary Examiner* — Ahmed Elnakib
(74) *Attorney, Agent, or Firm* — SALIWANCHIK, LLOYD & EISENSCHENK

(57) ABSTRACT

The present invention may provide a motor including a shaft, a rotor coupled to the shaft, a stator disposed outside the rotor, a busbar disposed above the stator, and a power terminal unit coupled to the busbar connected to the coils, wherein the power terminal unit includes a first groove, the busbar includes a busbar body and a plurality of terminals disposed on the busbar body, the busbar body includes a plurality of first protrusions protruding from an upper surface of the busbar body and disposed in the first groove, and the plurality of first protrusions are disposed on the same circular orbit based on a center of the busbar.

14 Claims, 36 Drawing Sheets

(58) Field of Classification Search
USPC .......................................................... 310/71
See application file for complete search history.

(56) References Cited

U.S. PATENT DOCUMENTS

| | | | |
|---|---|---|---|
| 2015/0162809 A1* | 6/2015 | Han | H02K 5/225 |
| | | | 310/71 |
| 2015/0357888 A1 | 12/2015 | Houzumi et al. | |
| 2017/0201148 A1* | 7/2017 | Haga | H02K 5/225 |
| 2018/0123414 A1* | 5/2018 | Kim | H02K 3/18 |
| 2020/0014272 A1 | 1/2020 | Asahi et al. | |
| 2020/0195097 A1* | 6/2020 | Kodama | H02K 11/33 |

FOREIGN PATENT DOCUMENTS

| | | |
|---|---|---|
| KR | 10-2017-0045261 A | 4/2017 |
| KR | 10-2017-0052013 A | 5/2017 |
| KR | 10-2019-0048470 A | 5/2019 |
| WO | 2019/088424 A1 | 5/2019 |

OTHER PUBLICATIONS

Office Action dated Jan. 17, 2025 in Korean Application No. 10-2020-0022316.
International Search Report dated May 6, 2021 in International Application No. PCT/KR2021/001016.

* cited by examiner

MOTOR AND STATOR BUSBAR

CROSS-REFERENCE TO RELATED APPLICATIONS

This application is the U.S. national stage application of International Patent Application No. PCT/KR2021/001016, filed Jan. 26, 2021, which claims the benefit under 35 U.S.C. § 119 of Korean Application Nos. 10-2020-0022316, filed Feb. 24, 2020; and 10-2020-0033328, filed Mar. 18, 2020; the disclosures of each of which are incorporated herein by reference in their entirety.

TECHNICAL FIELD

The present invention relates to a motor.

BACKGROUND ART

A motor includes a rotor and a stator. Coils are wound around the stator. Connection ends of the coils wound around the stator may be connected to a busbar. The busbar includes a busbar body and terminals. The terminals may be electrically connected to the connection ends of the coils. In addition, the terminals may be integrally formed with power terminals which are connected to an external power source.

The terminals may include terminal bodies, a plurality of connection ends extending from the terminal bodies, and the power terminals. The bodies of the terminals have substantially curved surfaces, and the connection ends and the power terminals have shapes that are branched off from the bodies and bent. Particularly, since the power terminals are connected to the external power source, there is a feature that lengths of the power terminals are long.

Accordingly, there is a problem that a shape of a development figure of a plate member for manufacturing the terminals is very complicated. When the shape of the development figure is complicated, a manufacturing process is complicated, and thus there is a problem that a large amount of scrap is generated during a terminal manufacturing process.

In addition, shapes and sizes of the terminals applied to a motor differ depending on positions of the power terminals. Accordingly, there are problems that not only does an amount of waste scraps considerably increase in a process of manufacturing various terminals but also the numbers of molds and processes for manufacturing the terminals increase.

In addition, the stator, the busbar, the busbar terminals, and the power terminals may have tolerances in an axial direction in an assembly process. In this case, there is a problem that positions of the power terminals in the axial direction vary while the tolerances are accumulated. Accordingly, there is a problem that the positions of the power terminals deviate from an allowable error range, causing a defect in the motor.

DISCLOSURE

Technical Problem

The present invention is directed to providing a motor including a terminal of which a small amount of scrap is generated during a manufacturing process.

In addition, the present invention is directed to providing a motor which is usable at various positions of power terminals.

In addition, the present invention is directed to providing a motor which inhibits a change in position of a power terminal in an axial direction due to a cumulative tolerance.

Objectives to be achieved by the present invention are not limited to the above-described objectives, and other objectives which are not described above will be clearly understood by those skilled in the art from the following specification.

Technical Solution

One aspect of the present invention provides a motor including a rotary shaft, a rotor coupled to the rotary shaft, a stator disposed outside the rotor, a busbar disposed above the stator, and a power terminal unit coupled to the busbar connected to a coils, wherein the power terminal unit includes a first groove, the busbar includes a busbar body and a plurality of terminals disposed on the busbar body, the busbar body includes a plurality of first protrusions protruding from an upper surface of the busbar body and disposed in the first groove, and the plurality of first protrusions are disposed on the same circular orbit based on a center of the busbar.

The busbar body may include a first busbar body and second busbar bodies disposed as a multistage structure in a vertical direction, and the first protrusions may be disposed on any one of the first busbar body and the second busbar bodies.

The first protrusions may be disposed on the first busbar body, and the first protrusions may be disposed to overlap the second busbar body in a circumferential direction.

The first protrusions may be disposed between the second busbar bodies separated from each other in the circumferential direction.

The plurality of first protrusions may be rotationally symmetrically disposed.

The terminal may include a terminal body, third protrusions extending from an end portion of the terminal body and connected to an end portion of the coil, and fourth protrusions branched off from the third protrusions and connected to the power terminal, and the plurality of first protrusions may be disposed between the adjacent fourth protrusions in a circumferential direction of the busbar.

Another aspect of the present invention provides a motor including a rotary shaft, a rotor coupled to the rotary shaft, a stator disposed to correspond to the rotor and including a stator core and coils, a busbar disposed above the stator, and a power terminal unit connected to the coils and coupled to the busbar, wherein the power terminal unit include second protrusions, the busbar includes a busbar body and a plurality of terminals disposed on the busbar body, the busbar body includes a plurality of second grooves which are disposed in an upper surface of the busbar body and in which the second protrusions are disposed, and the plurality of second grooves are disposed on the same circular orbit based on a center of the busbar.

The busbar body may include a first busbar body and second busbar bodies disposed as a multistage structure in a vertical direction, and the second grooves may be disposed in any one of the first busbar body and the second busbar bodies.

The second grooves may be disposed in the first busbar body, and the second grooves may be disposed to overlap the second busbar bodies in a circumferential direction.

The second grooves may be disposed between the second busbar bodies separated in the circumferential direction.

The plurality of second grooves may be rotationally symmetrically disposed.

The terminal may include a terminal body and third protrusions extending from an end portion of the terminal body and connected to end portions of the coils and fourth protrusions breached off from the third protrusions and connected to the power terminal, and the plurality of the second grooves may be disposed between the adjacent fourth protrusions in a circumferential direction of the busbar.

The third protrusions may be members of which horizontal cross sections have rectangular shapes, and a direction toward a long side of each of the horizontal cross sections may be a radial direction of the busbar.

The fourth protrusions may be members of which horizontal cross sections have rectangular shapes, and a direction toward a long side of each of the horizontal cross sections may be the circumferential direction of the busbar.

The plurality of fourth protrusions may be disposed on different circumferences based on the center of the busbar.

Still another aspect of the present invention provides a motor including a shaft, a rotor coupled to the shaft, a stator disposed to correspond to the rotor, a busbar including a busbar body and a plurality of terminals disposed on the busbar body, and a power terminal unit including a power terminal unit body and a plurality of power terminals disposed on the power terminal unit body, wherein the busbar includes a first busbar body in which a first terminal is disposed and a second busbar body which is disposed on the first busbar body and in which a second terminal is disposed, an upper surface of the first busbar body includes a plurality of first coupling parts, a lower surface of the power terminal unit body includes a plurality of second coupling parts coupled to the first coupling parts, and the second terminal and the plurality of power terminals are connected.

Yet another aspect of the present invention provides a motor including a shaft, a rotor coupled to the shaft, a stator disposed outside the rotor, a busbar disposed above the stator, and a housing which accommodates the stator and the busbar, wherein the housing includes a first part disposed above the busbar, the busbar includes at least one first support surface in contact with the first part, and the first part includes at least one second support surface in contact with the first support surface.

The first support surface and the second support surface may overlap in an axial direction.

The first support surface may be provided as a plurality of first support surfaces, the plurality of first support surfaces may be spaced apart from each other at equal intervals, the second support surface may be provided as a plurality of second support surfaces, and the plurality of second support surfaces may correspond to positions of the first support surfaces.

The busbar may include at least one protrusion protruding toward the first part, and the second support surface may be disposed on an end surface of the protrusion.

The busbar may include a first terminal connected to the stator and a second terminal connected to the first terminal and an external power source, and a hole through which the second terminal passes may be formed in the first part.

The busbar may include a body which insulate the first terminal and the second terminal from each other, and at least one protrusion may be disposed on an upper surface of the body.

The second support surface may be disposed at a higher level than the upper surface of the body and disposed at a lower level than an upper end of the second terminal.

The protrusion may include a first member extending from the body and a second member disposed inside the first member.

An end surface of the second member may be disposed at a higher level than an end surface of the first member, and the second support surface may be disposed on the end surface of the second member.

The first member may be formed of the same material as the busbar body, and the second member may be formed of a different material from the first member.

The number of the protrusions may be three, and the three protrusions may be disposed to be spaced at intervals of 120 degrees based on a rotation axis of the shaft.

Distances from the three protrusions to an axial center may be the same.

The second terminal may be disposed between any one protrusion and another protrusion among the three protrusions in a circumferential direction.

The housing may include a second part disposed outside the stator and the busbar and a third part disposed under the stator, the first part and the second part may be one part, and the third part may be coupled to the second part.

The first part may include a first surface facing the busbar and a second surface disposed at an opposite side of the first surface, and the at least one first support surface may be disposed in the first surface.

The first support surface may be a flat surface, and an area of the first support surface may be greater than an area of an end surface of the second support surface.

The body and the first support surface may be spaced apart from each other in the axial direction, and a separation distance between the body the first support surface may be the same as a length of the protrusion in the axial direction.

Advantageous Effects

According to embodiments, since the present invention includes a terminal of which a small amount of scrap is generated during a manufacturing process, the present invention provides an advantageous effect of significantly reducing manufacturing costs.

According to the embodiments, the present invention provides an advantageous effect of being usable at various positions of power terminals.

According to the embodiments, while a busbar is inserted into a housing, the busbar comes into contact with an inner surface of the housing so that the busbar can be disposed at a regular position. In addition, a change in position of a power connection portion of the terminal due to a cumulative tolerance can be inhibited by guiding the power connection portion to the regular position. Accordingly, defects of a motor due to a connection failure of the power terminals can be reduced.

MODES OF THE INVENTION

A direction parallel to a longitudinal direction (vertical direction) of a shaft will be referred to as an axial direction, a direction perpendicular to the axial direction about the shaft will be referred to as a radial direction, and a direction along a circumference of a circle having a radius in the radial direction about the shaft will be referred to as a circumferential direction.

Figure 1:
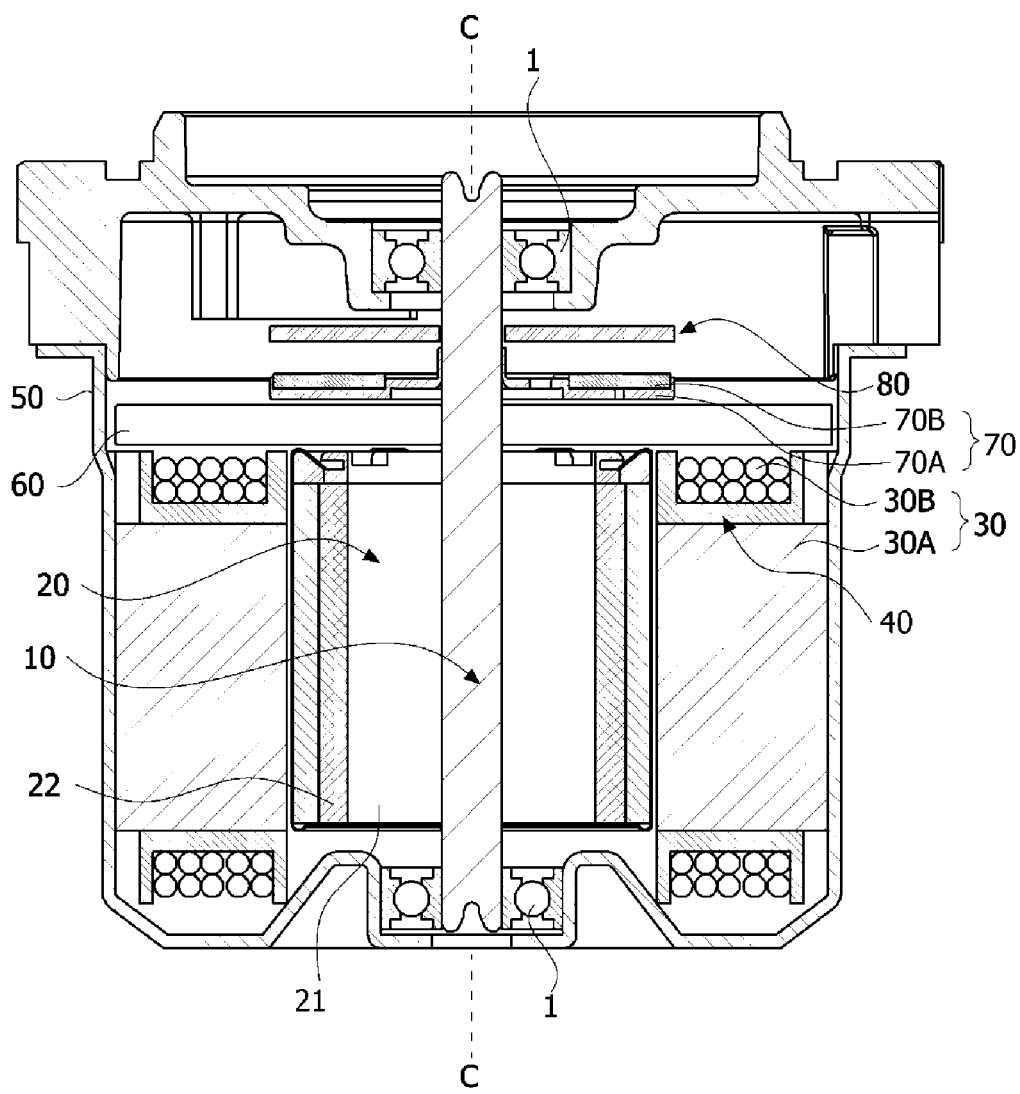
FIG. 1 is a view illustrating a motor according to an embodiment.

FIG. 1 is a view illustrating a motor according to an embodiment.

Referring to FIG. 1, the motor according to the embodiment may include a shaft 10, a rotor 20, a stator 30, an insulator 40, a housing 50, a busbar 60, a sensing part 70, and a substrate 80. Hereinafter, the term "inward" is a direction from the housing 50 toward the rotary shaft 10 which is a center of the motor, and the term "outward" is a direction opposite to "inward," that is, a direction from the rotary shaft 10 toward the housing 50. In addition, a circumferential direction or radial direction is defined based on an axial center.

The shaft 10 may be coupled to the rotor 20. When an electromagnetic interaction occurs between the rotor 20 and the stator 30 when a current is supplied, the rotor 20 rotates, and the shaft 10 rotates in conjunction with the rotor 20. The shaft 10 is rotatably supported by bearings 1. The shaft 10 may be connected to a steering apparatus of a vehicle and transmit power to the steering apparatus.

The rotor 20 rotates due to the electrical interaction with the stator 30. The rotor 20 may be disposed to correspond to the stator 30 and disposed inside the stator 30. The rotor 20 may include a rotor core 21 and magnets 22 disposed on the rotor core 21. In this case, the rotor 20 may be a surface permanent magnet (SPM) type in which the magnets 22 are disposed on an outer circumferential surface of the rotor core 21.

The stator 30 is disposed outside the rotor 20. The stator 30 may include a stator core 30A, coils 30B, and an insulator 40 installed on the stator core 30A. The coils 30B may be wound around the insulator 40. The insulator 40 is disposed between the coils 30B and the stator core 30A to serve to electrically insulate the stator core 30A from the coils 30B. The coils 30B induce an electrical interaction with the magnets of the rotor 20.

The busbar 60 is disposed above the stator 30. The busbar 60 includes a busbar body 100 formed of an insulation material and a plurality of terminals coupled to the busbar body. In this case, the busbar body is formed of the insulation material to serve to inhibit connections between the plurality of terminals. In addition, the plurality of terminals serve to connect the coils 30B wound around the stator core 30A and serve to apply a current to the coils.

The sensing part 70 may be coupled to the shaft 10. The sensing part 70 includes a sensing plate 70A and a sensing magnet 70B disposed on the sensing plate. A sensor which detects a magnetic force of the sensing magnet 70B may be disposed on the substrate 80. In this case, the sensor may be a Hall integrated circuit (IC) and serves to detect a magnetic flux of the sensing magnet 70B of the sensing part 70 coupled to the shaft 10. The sensing part 70 and the substrate 80 serve a function for detecting a position of the rotor 20 by detecting the magnetic flux which varies according to rotation.

Figure 2:
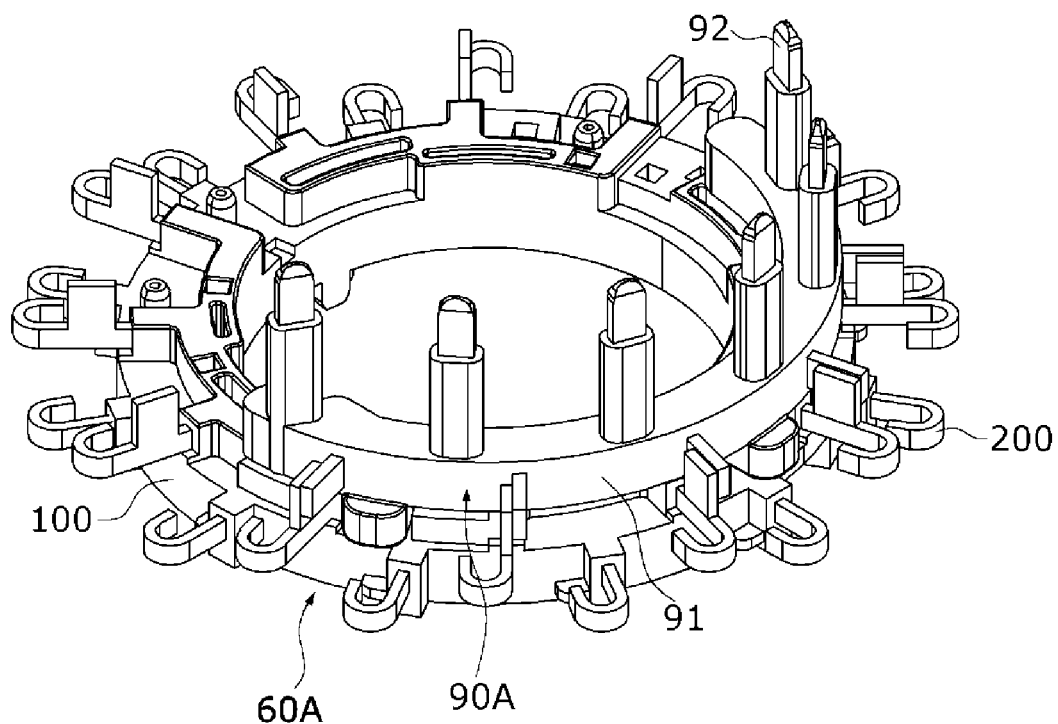
FIG. 2 is a view illustrating a power terminal unit and a busbar.
Figure 3:
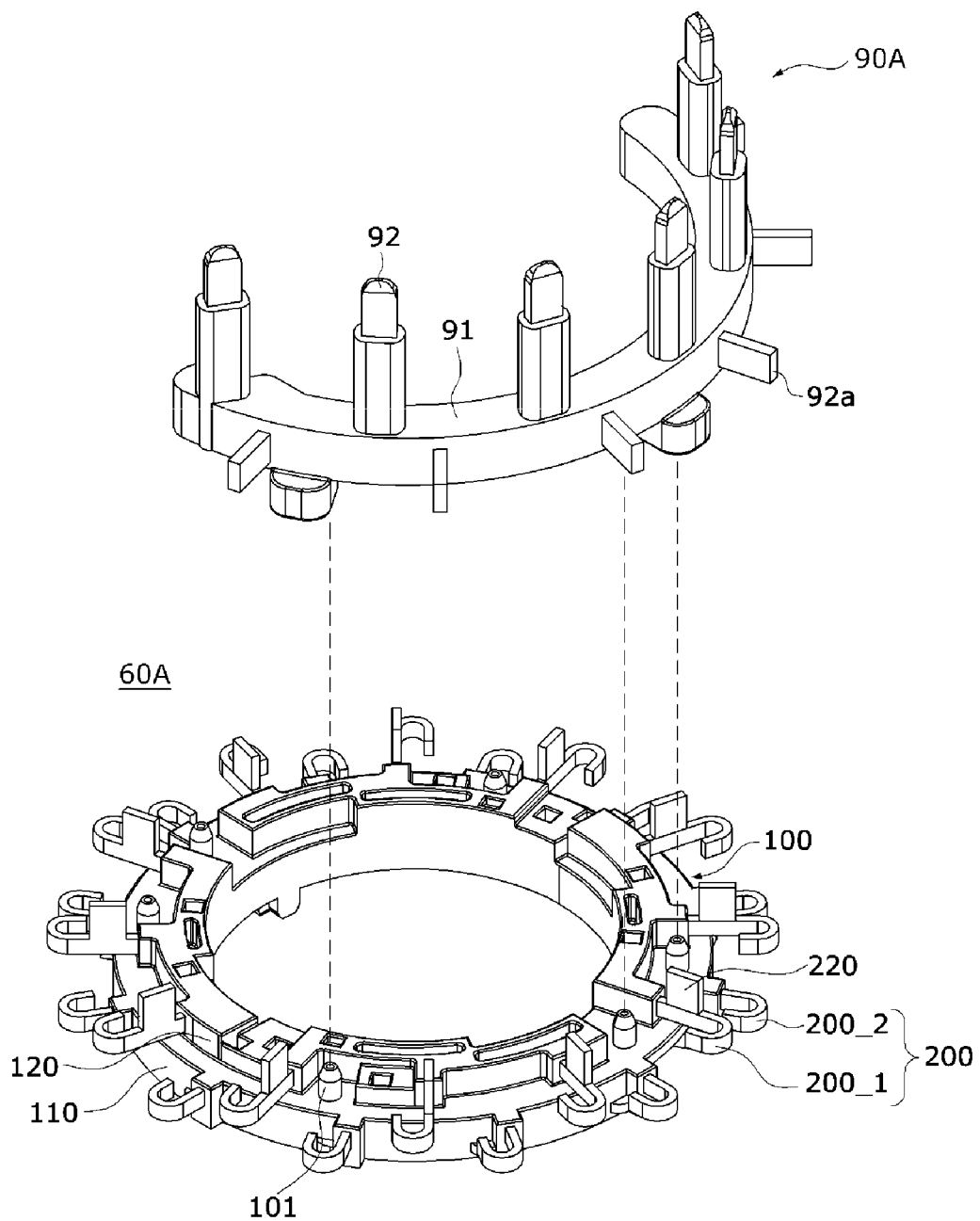
FIG. 3 is a view illustrating a state in which the power terminal unit and the busbar are separated.

FIG. 2 is a view illustrating a power terminal unit and a busbar, and FIG. 3 is a view illustrating a state in which the power terminal unit and the busbar are separated.

Referring to FIGS. 2 and 3, a busbar 60A may include a busbar body 100 and terminals 200. The busbar body 100 may be an annular mold member. The busbar body 100 may include a first busbar body 110 and second busbar bodies 120. The second busbar bodies 120 may be disposed on the first busbar body 110, and thus the busbar body 100 may be disposed as a multistage structure in a vertical direction.

The terminals 200 may include second terminals 200_1 connected to U-phase, V-phase, and W-phase power sources, and neutral terminals 200_2 connecting the second terminals 200_1. The second terminals 200_1 may not include power terminals which are connected to an external power source, and the second terminals 200_1 may be connected to separate power terminals connected to the external power source.

The neutral terminals 200_2 may be disposed in the first busbar body 110 of the busbar body 100. The second terminals 200_1 may be disposed in the second busbar bodies 120 of the busbar body 100.

The power terminal unit 90A may be disposed on the busbar 60A. The power terminal unit 90A may include a body 91 and power terminals 92. The body 91 is coupled to the busbar body 100. In a state in which the power terminal unit 90A is coupled to the busbar body 100, one end portion of each of the power terminals 92 may be connected to one of the second terminals 200_1 of the busbar 60A, and the other end portion is connected to an external power source.

Figure 4:
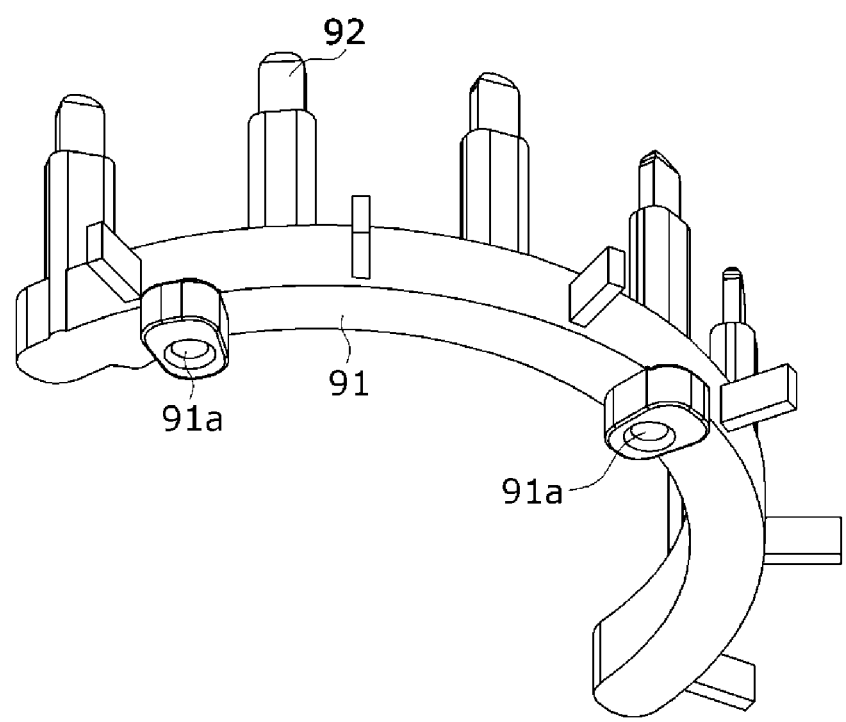
FIG. 4 is a bottom view illustrating the power terminal unit.

FIG. 4 is a bottom view illustrating the power terminal unit 90A.

Referring to FIGS. 3 and 4, the body 91 of the power terminal unit 90A may include a plurality of first grooves 91a as second coupling parts. The first grooves 91a are concavely formed in a lower surface of the body 91. The first grooves 91a are grooves for coupling the power terminal unit 90A and the busbar 60A, to which first protrusions 101 which are first coupling parts of the busbar 60A are press-fitted. In a state in which the power terminal unit 90A is coupled to the busbar body 100, end portions of the power terminals 92 are aligned with and in contact with fourth protrusions 230 of the second terminals 200_1 of the busbar 60A.

The terminals 200 may include first terminals 200_2 and the second terminals 200_1. The first terminals may be neutral terminals, and the second terminals 200_1 may be phase terminals.

Figure 5:
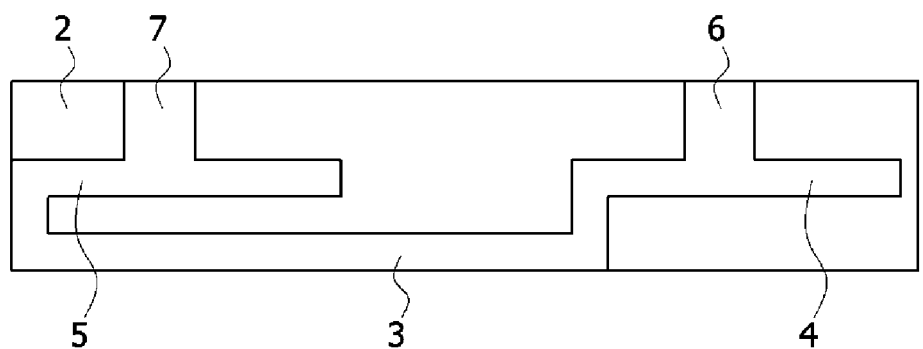
FIG. 5 is a view illustrating a plate member for forming a phase terminal of the busbar.

FIG. 5 is a view illustrating a plate member for forming a phase terminal of the busbar.

Referring to FIG. 5, each of the second terminals 200_1 may be manufactured by performing a pressing process on a plate member 2. The plate member 2 may be a strap type member having a predetermined width. The plate member 2 may include a first region 3 for forming a terminal body 210 of the second terminal 200_1, a second region 4 and a third region 5 for forming third protrusions 220 of the second terminal 200_1 (see FIGS. 7, 8, and 9), and a fourth region 6 and a fifth region 7 for forming the fourth protrusions 230 of the second terminal 200_1 (see FIGS. 7, 8, and 9).

The first region 3 is disposed to extend along one edge of the plate member 2. The second region 4 may have a shape that is bent upward from one end of the first region 3 and then bent outward from the first region 3. The third region 5 may have a shape that is bent upward from the other end of the first region 3 and then bent inward from the first region 3. The second region 4 and the third region 5 may be formed to be bent in the same direction and extend in the same direction from the first region 3. The fourth region 6 may have a shape that is branched off upward from the second region 4. The fourth region 6 is formed to extend to the other edge of the plate member 2. The fifth region 7 may have a shape that is branched off upward from the third region 5. The fifth region 7 is also formed to extend to the other edge of the plate member 2.

A shape of the second terminal 200_1 may be formed to have the first region 3, the second region 4, the third region 5, the fourth region 6, and the fifth region 7 of the plate member 2.

Figure 6:
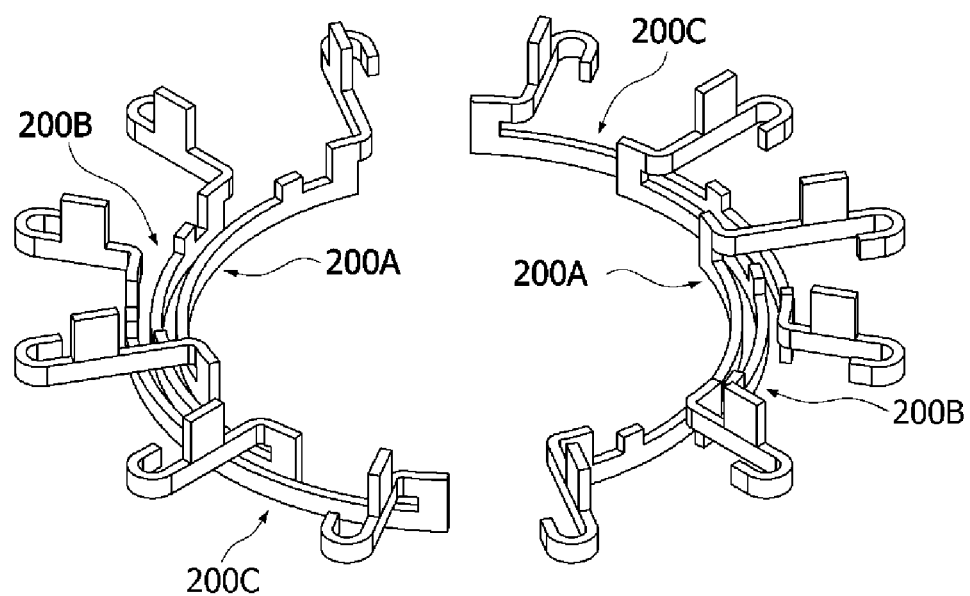
FIG. 6 is a perspective view illustrating phase terminals.
Figure 7:
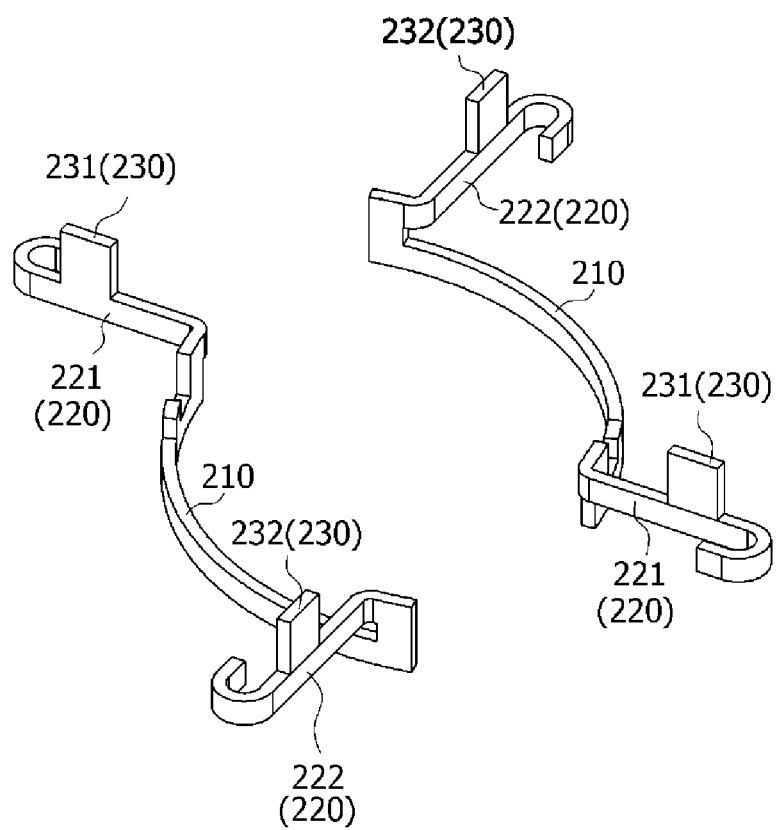
FIG. 7 is a perspective view illustrating first terminals.
Figure 8:
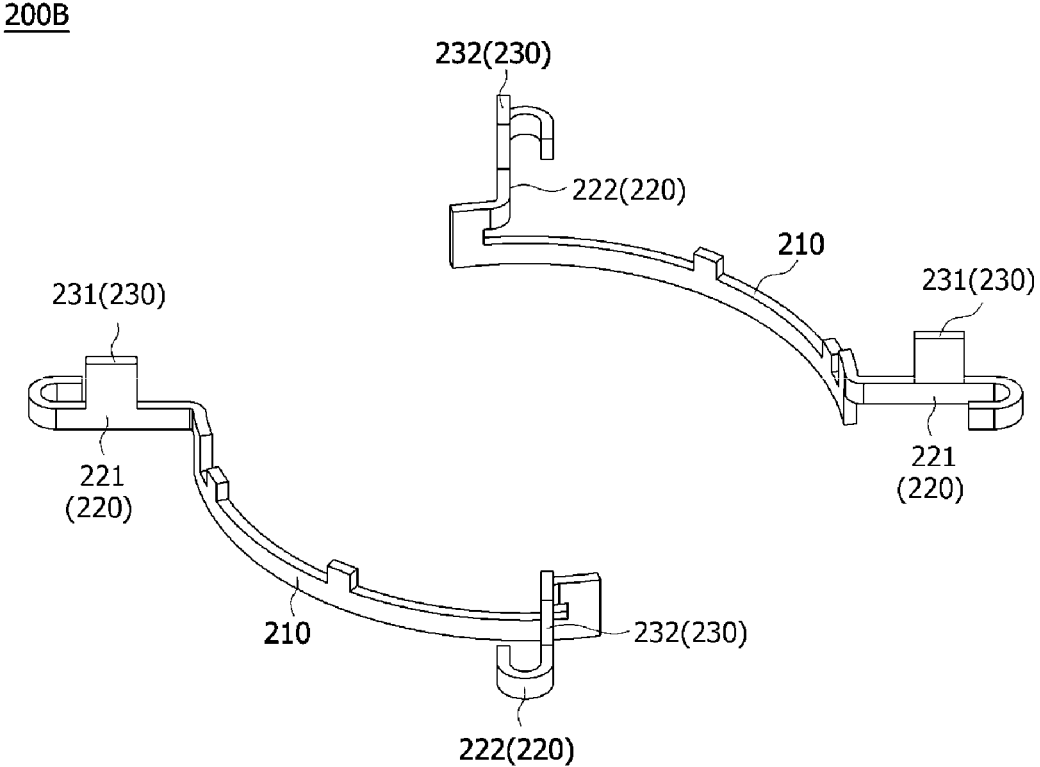
FIG. 8 is a perspective view illustrating second terminals.
Figure 9:
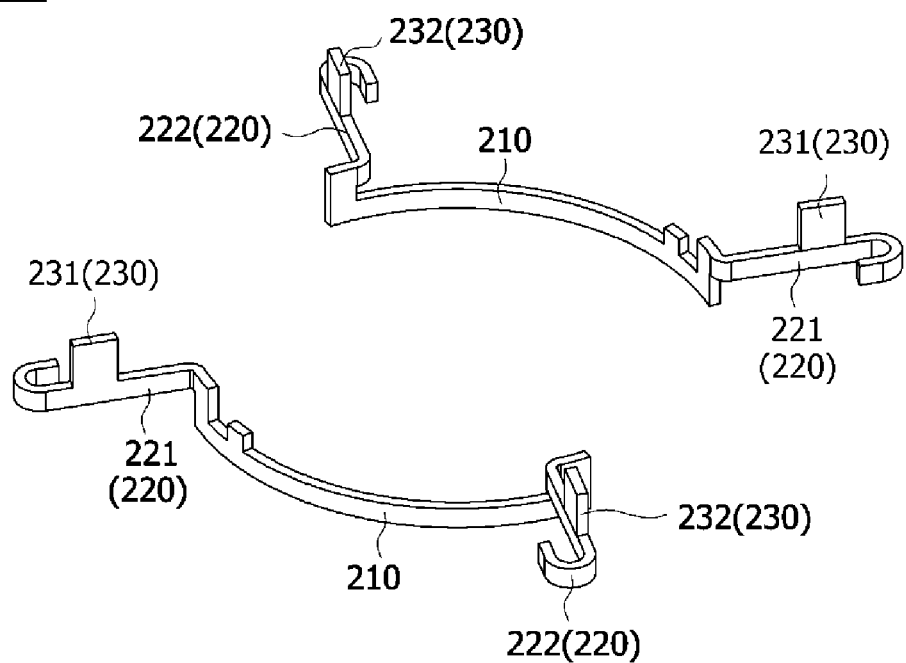
FIG. 9 is a perspective view illustrating third terminals.

FIG. 6 is a perspective view illustrating the second terminals 200_1, FIG. 7 is a perspective view illustrating 2-1 terminals 200A, FIG. 8 is a perspective view illustrating 2-2 terminals 200B, and FIG. 9 is a perspective view illustrating 2-3 terminals 200C.

Referring to FIGS. 6 to 9, the second terminals 200_1 may include the 2-1 terminals 200A, the 2-2 terminals 200B, and the 2-3 terminals 200C connected to the U-phase, V-phase, and W-phase power sources. One group of terminals including the 2-1 terminal 200A, the 2-2 terminal 200B, the 2-3 terminal 200C, and the neutral terminal 200_2 may be disposed as a pair.

Each of the first terminals 200A, the 2-2 terminals 200B, and the 2-3 terminals 200C may include a terminal body 210, the third protrusions 220, and the fourth protrusions 230.

The terminal body 210 of the 2-1 terminal 200A, the terminal body 210 of the 2-2 terminal 200B, and the terminal body 210 of the 2-3 terminal 200C may be disposed at different positions in a radial direction of the busbar 60A. Based on the terminal body 210, the 2-1 terminal 200A, the 2-2 terminal 200B, and the 2-3 terminal 200C may be disposed in order from the inside to the outside.

In addition, the 2-1 terminal 200A, the 2-2 terminal 200B, and the 2-3 terminal 200C may be disposed to include regions overlapping in a radial direction. The 2-1 terminal 200A, the 2-2 terminal 200B, and the 2-3 terminal 200C may be disposed to stand so that widths in the vertical direction are greater than widths in a horizontal direction which correspond to a thickness of the plate member 2.

The third protrusions 220 are protrusions in contact with end portions of the coils 30B. The third protrusions 220 are disposed to extend upward from end portions of the terminal body 210 and to be bent outward in the radial direction. Ends of the third protrusions 220 are disposed to be bent in hook shapes to surround first end portions (not shown) of the coils 30B. The third protrusions 220 may include a 3-1 protrusion 221 and a 3-2 protrusion 222. The 3-1 protrusion 221 may be disposed at one end portion of the terminal body 210. The 3-2 protrusion 222 may be disposed at the other end portion of the terminal body 210. The 3-1 protrusion 221 may be connected to one end portion of the coil 30B. The 3-2 protrusion 222 may be connected to the other end portion (not shown) of the coil 30B which is the other coil 30B connected to the 3-1 protrusion 221. Although not illustrated in the drawings, the other end portion of the coil 30B may be connected to the neutral terminal 200_2.

The fourth protrusions 230 are protrusions in contact with separate power terminals. The fourth protrusions 230 are disposed to be branched off upward from the third protrusions 220. The fourth protrusions 230 may be rectangular members having flat surfaces. The fourth protrusions 230 may include a 4-1 protrusion 231 and a 4-2 protrusion 232. The 4-1 protrusion 231 may be branched off from the 3-1 protrusion 221. The 4-2 protrusion 232 may be branched off from the 3-2 protrusion 222.

The 2-1 terminal 200A, the 2-2 terminal 200B, and the 2-3 terminal 200C include the terminal bodies 210, the third protrusions 220, and the fourth protrusions 230, and shapes thereof are substantially the same, but lengths of the terminal bodies 210 in a circumferential direction or lengths of the third protrusions 220 may be different. However, sizes and shapes of the fourth protrusions 230 of the 2-1 terminal 200A, the 2-2 terminal 200B, and the 2-3 terminal 200C may be the same. This is for commonly using the second terminal 200_1 to correspond to the power terminals at various positions.

Figure 10:
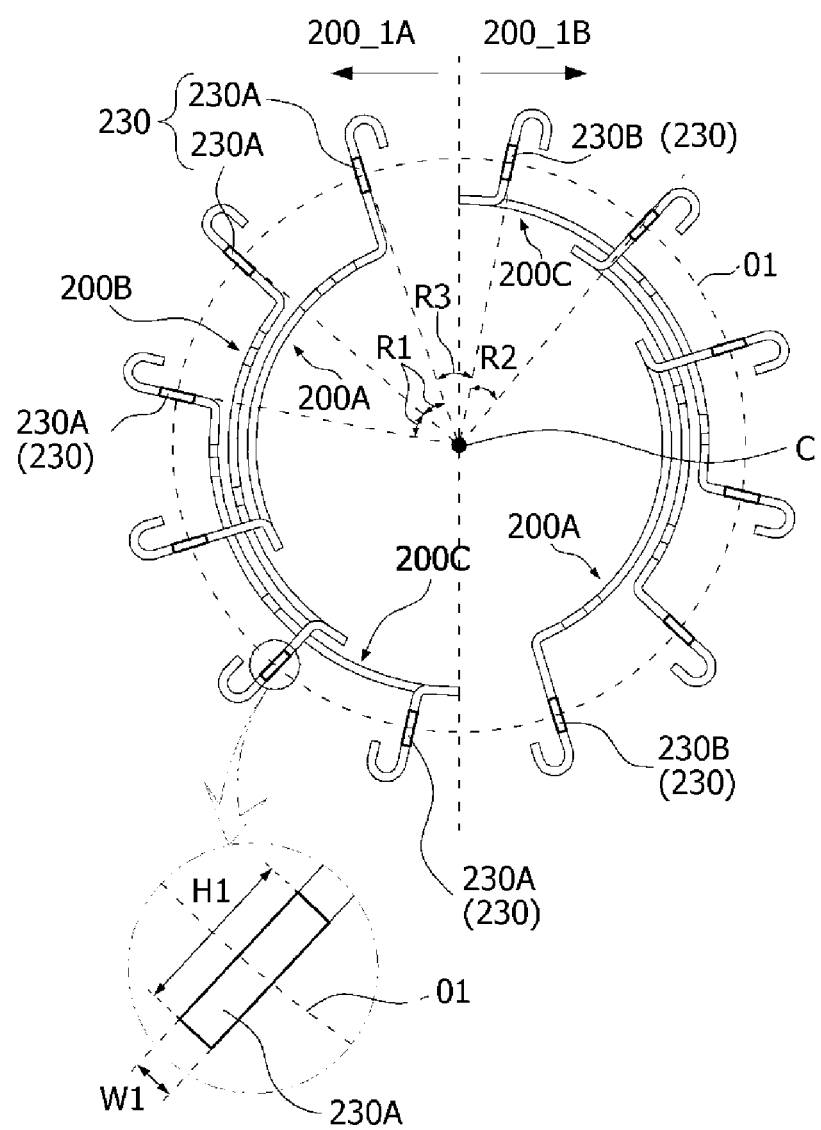
FIG. 10 is a plan view illustrating the phase terminals.

FIG. 10 is a plan view illustrating the second terminals 200_1.

Referring to FIG. 10, the plurality of fourth protrusions 230 disposed on all the second terminals 200_1 are disposed at the same position in the radial and vertical directions of the busbar 60A. In addition, the plurality of fourth protrusions 230 may be disposed at equal intervals in a circumferential direction of the busbar 60A.

The fourth protrusions 230 are rectangular members of which horizontal cross sections have widths W1 greater than lengths H1. In this case, a direction toward a long side of each of the horizontal cross sections may be the radial direction of the busbar 60A. Width centers of horizontal ends of the plurality of fourth protrusions 230 in the radial direction may be disposed on the same orbit based on a center C of the busbar 60A. Accordingly, the plurality of fourth protrusions 230 may be radially disposed based on the center C of the busbar 60A.

The plurality of fourth protrusions 230 may be disposed at equal intervals in the circumferential direction of the busbar 60A. For example, the second terminals 200_1 may be divided into the second terminals 200_1 of a first group 200_1A (hereinafter, referred to as the first group 200_1A) and the second terminals 200_1 of a second group 200_1B (hereinafter, referred to as the second group 200_1B) which are electrically separated. The first group 200_1A and the second group 200_1B may be disposed to be divided with respect to a virtual straight line passing through the center C of the busbar 60A. In addition, the first group 200_1A and the second group 200_1B may be disposed to be rotationally symmetrical with respect to the center C of the busbar 60A. Alternatively, the first group 200_1A and the second group 200_1B may also be symmetrically disposed with respect to the virtual straight line passing through the center C of the busbar 60A.

In this case, a first angle R1 of the first group 200_1A may be the same as a second angle R2 of the second group 200_1B. In this case, the first angle R1 is an angle which denotes a gap between the fourth protrusions 230 of the second terminals 200_1 of the first group 200_1A in the circumferential direction, and the second angle R2 denotes an angle which denotes a gap between the fourth protrusions 230 of the second terminals 200_1 of the second group 200_1B in the circumferential. A reference for each of the first angle R1 and the second angle R2 corresponds to a width center of the horizontal cross section of each of the fourth protrusions 230 in the circumferential direction.

A third angle R3 between the first group 200_1A and the second group 200_1B may also be the same as the first angle R1 or the second angle R2. In this case, the third angle R3 is an angle which denotes a gap in the circumferential direction between a second protrusion 230A of the first group 200_1A and a second protrusion 230B of the second group 200_1B which are adjacent to each other. A reference for the third angle R3 corresponds to the width center of the horizontal cross section of each the fourth protrusions 230 in the circumferential direction.

Figure 11:
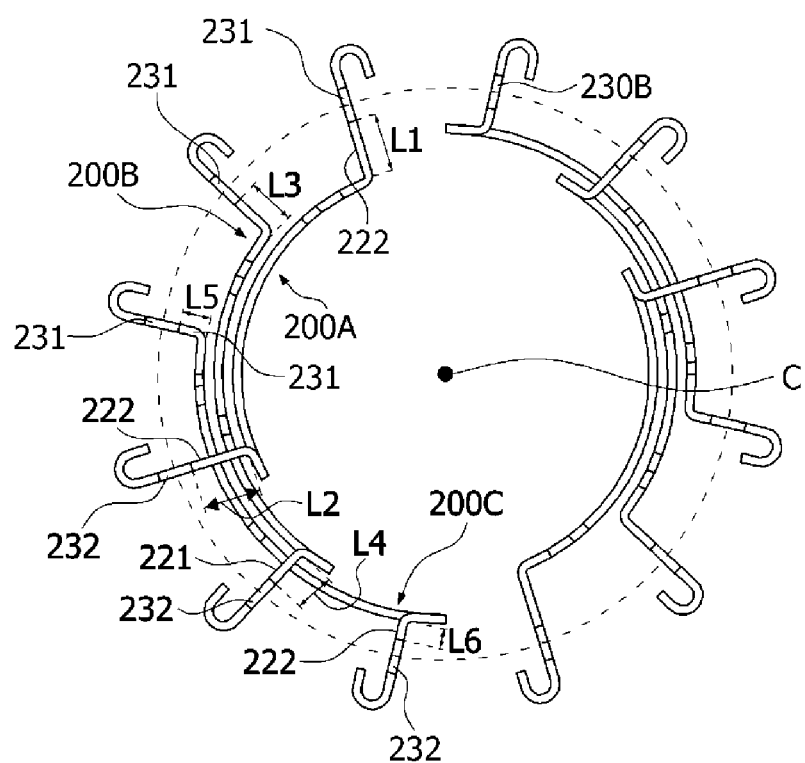
FIG. 11 is a plan view illustrating the phase terminals illustrated in FIG. 10 and illustrates lengths of third protrusions in a radial direction extending to fourth protrusions in the radial direction.

FIG. 11 is a plan view illustrating the second terminals 200_1 illustrated in FIG. 10 and illustrates lengths of the third protrusions 220 in the radial direction extending to the fourth protrusions 230 in the radial direction.

Referring to FIG. 11, hereinafter, the length of the third protrusion 220 in the radial direction extending to the fourth protrusion 230 in the radial direction is simply called a length. Lengths L1 and L2 of the 2-1 terminal 200A positioned relatively inward may be greater than lengths L3 and L4 of the 2-2 terminal 200B. In addition, lengths L5 and L6 of the 2-3 terminal 200C positioned relatively outward may be smaller than lengths L3 and L4 of the 2-2 terminal 200B.

Meanwhile, in the 2-1 terminal 200A, the 2-1 terminals 200B, and the 2-3 terminals 200C, the lengths L1, L3, and L5 of the 3-1 protrusions 221 and the lengths L2, L4, and L6 of the 3-2 protrusions 222 may be the same.

Figure 12:
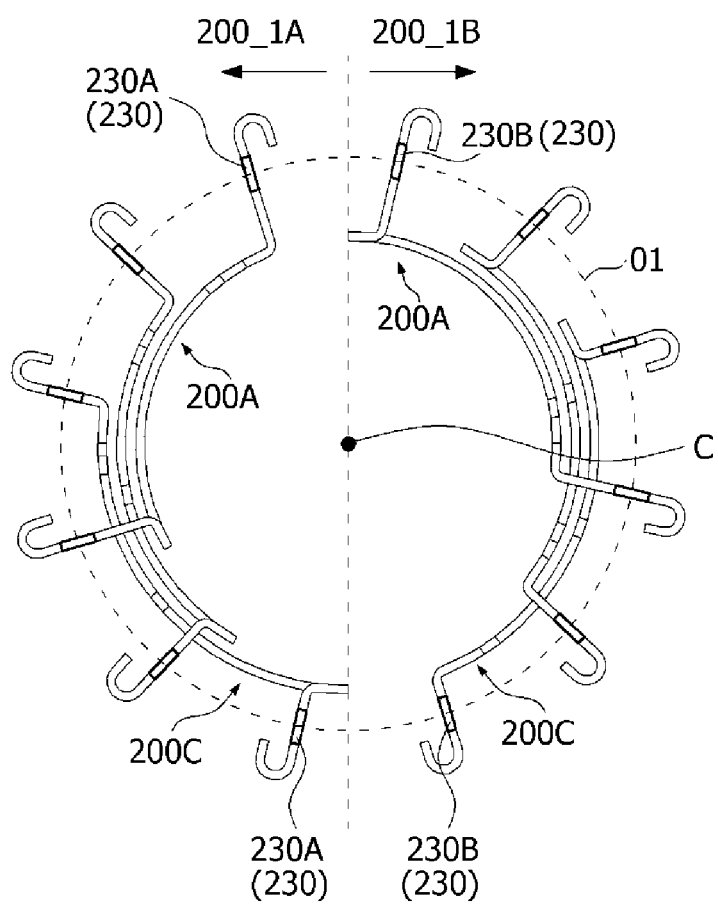
FIG. 12 is a view illustrating phase terminals according to a modified embodiment.

FIG. 12 is a view illustrating second terminals 200_1 according to a modified embodiment.

Referring to FIGS. 10 and 12, in the case of FIG. 10, a second protrusion 230A of the first group 200_1A and a second protrusion 230B of the second group 200_1B, which are adjacent to each other, are disposed on the terminals disposed at different positions in a radial direction. For example, the second protrusion 230A of the first group 200_1A is disposed on the 2-1 terminal 200A, and the second protrusion 230B of the second group 200_1B is disposed on the 2-3 terminal 200C of which a position is different from a position of the first terminal 200A in the radial direction.

Conversely, in the case of FIG. 12, a second protrusion 230A of a first group 200_1A and a second protrusion 230B of a second group 200_1B, which are adjacent to each other, may be disposed on terminals disposed at the same position in the radial direction. For example, the second protrusion 230A of the first group 200_1A may be disposed on a 2-1 terminal 200A, and the second protrusion 230B of the second group 200_1B may also be disposed on the other 2-1 terminal 200A of which a position is the same as a position of the first terminal 200A in the radial direction FIG. 13 is a plan view illustrating the busbar body 100.

Figure 13:
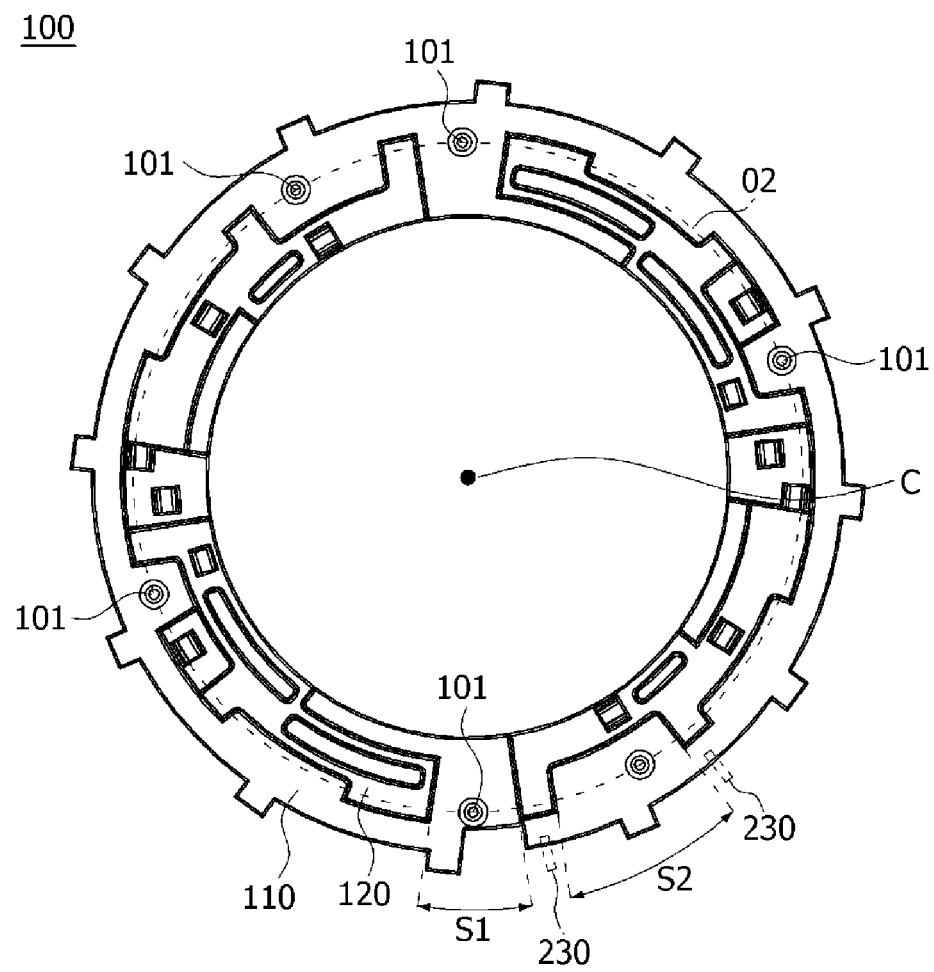
FIG. 13 is a plan view illustrating a busbar body.

Referring to FIGS. 3 and 13, the busbar body 100 may include the plurality of first protrusions 101. The plurality of first protrusions 101 protrude upward from an upper surface of the first busbar body 110 of the busbar body 100. The first protrusions 101 may be coupled to the body surrounding the power terminals. The first protrusions 101 are for arranging positions of the power terminals coupled to the busbar 60A and the fourth protrusions 230. The first protrusions 101 may have cylindrical shapes, and upper end portions of the first protrusions 101 may have cone shapes.

Centers of the plurality of first protrusions 101 may be disposed on the same orbit based on the center C of the busbar 60A. This is for commonly using the second terminal 200_1 to correspond to the positions of the various power terminals.

The first protrusions 101 may be disposed further inward than the fourth protrusions 230 in the radial direction of the busbar 60A. In addition, the first protrusions 101 may be disposed not to overlap the fourth protrusions 230 in the circumferential direction of the busbar 60A. That is, each of the first protrusions 101 may be disposed between the adjacent fourth protrusions 230 in the circumferential direction of the busbar 60A. In addition, the first protrusions 101 may be disposed to overlap the second busbar bodies 120.

Empty spaces S1 and S2 having predetermined widths in the circumferential direction may be formed by the second busbar bodies 120 of the busbar body 100. The first protrusions 101 may be disposed in the empty spaces S1 and S2. The empty spaces S1 and S2 may be spaces formed by separating the second busbar bodies 120 from each other like the spaces S1 of FIG. 13 or may be second grooves of the second busbar bodies 120 concavely formed in the radial direction like the spaces S2 of FIG. 13. The first protrusions 101 may be disposed in the empty spaces S1 and S2. Side surfaces of the second busbar bodies 120, which constitute boundaries of the empty spaces S1 and S2, serve to guide the power terminals in a process of coupling the power terminals to the busbar 60A.

Although an example of the first protrusions 101 disposed on the first busbar body 110 is illustrated, but the present invention is not limited thereto, and the first protrusions 101 may be disposed on the second busbar bodies 120.

Figure 14:
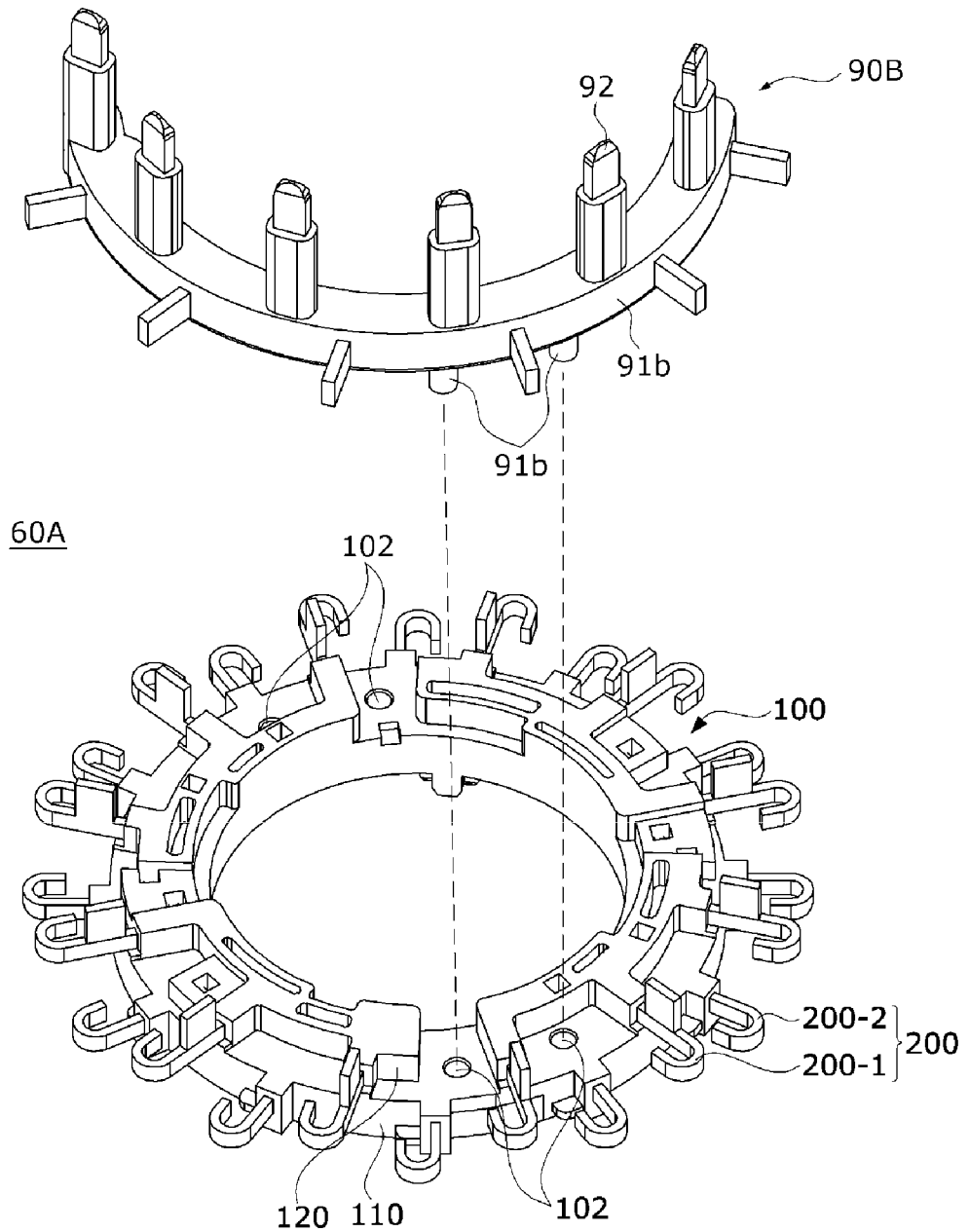
FIG. 14 is a perspective view illustrating a power terminal unit and a busbar according to a modified embodiment.
Figure 15:
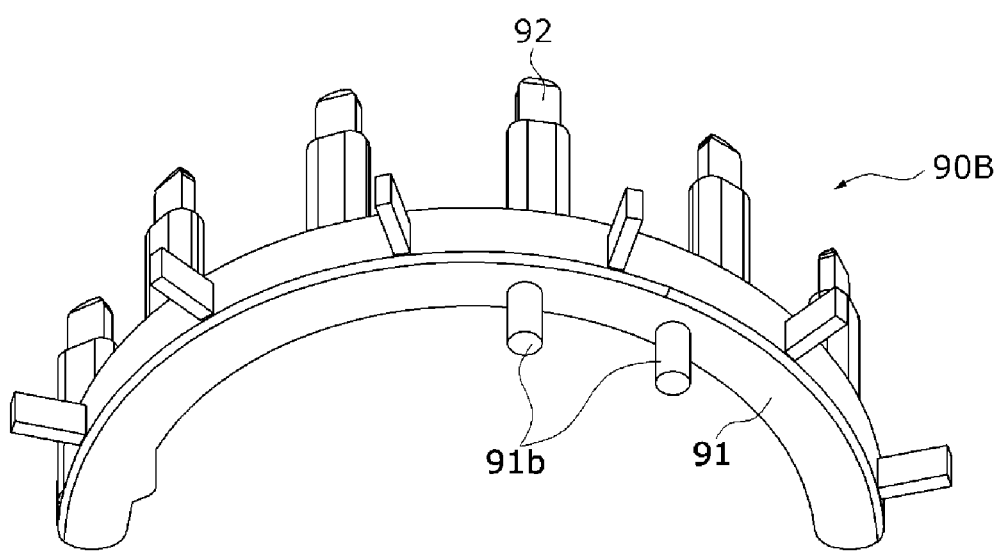
FIG. 15 is a bottom view illustrating the power terminal unit illustrated in FIG. 14.

FIG. 14 is a perspective view illustrating a power terminal unit 90B and a busbar 60A according to a modified embodiment, and FIG. 15 is a bottom view illustrating the power terminal unit 90B illustrated in FIG. 14.

Referring to FIGS. 14 and 15, a body 91 of a power terminal unit 90B may include a plurality of second protrusions 91b. The second protrusions 91b are formed to protrude from a lower surface of the body. The second protrusions 91b are protrusions for coupling the power terminal unit 90B and the busbar 60A, which is press-fitted in second grooves 102 of the busbar 60A.

Figure 16:
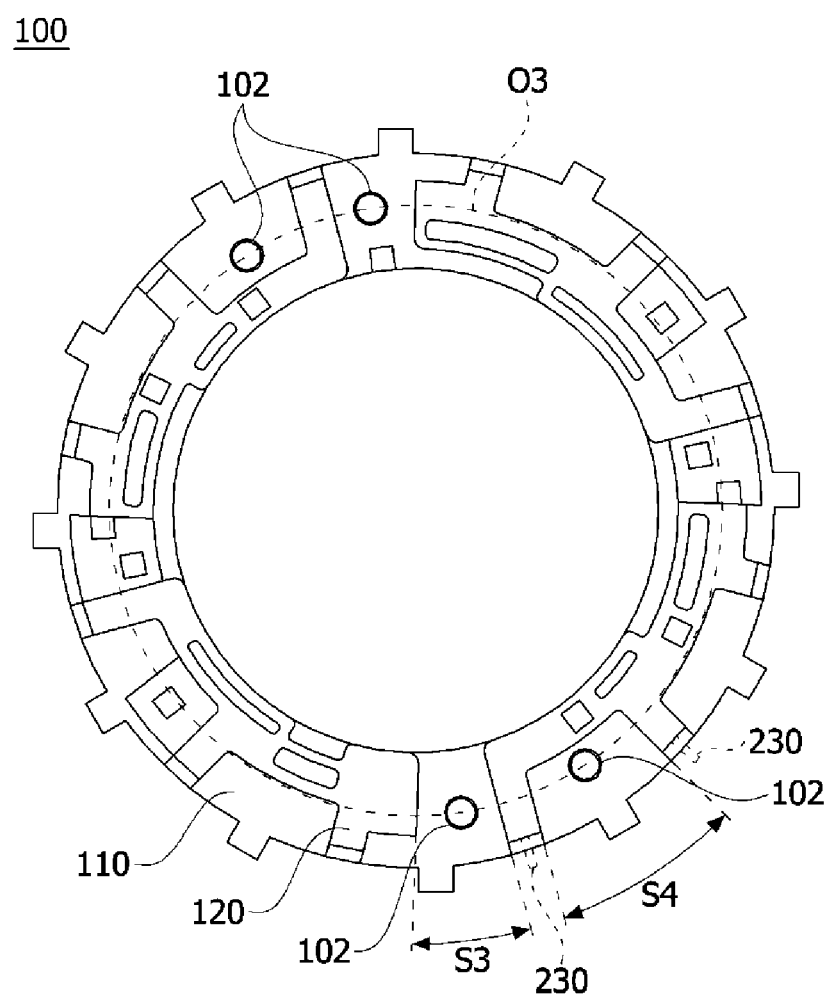
FIG. 16 is a plan view illustrating a busbar body illustrated in FIG. 14.

FIG. 16 is a plan view illustrating a busbar body 100 illustrated in FIG. 14.

Referring to FIGS. 14 and 16, the busbar 60A according to the modified embodiment may include the second grooves 102 instead of first protrusions 101. The busbar body 100 may include the plurality of second grooves 102. The plurality of second grooves 102 may be concavely formed in an upper surface of the busbar body 100. The second grooves 102 may be coupled to protruding structures of the body surrounding the power terminals. The second grooves 102 are also for arranging positions of the power terminals coupled to the busbar 60A and fourth protrusions 230. Centers of the plurality of second grooves 102 may be disposed on the same circular orbit O3 based on a center C of the busbar 60A. This is for commonly using a second terminal 200_1 to correspond to positions of the various power terminals. The second grooves 102 may be disposed not to overlap the fourth protrusions 230 in a circumferential direction of the busbar 60A. That is, each of the second grooves 102 may be disposed between the adjacent second protrusions 230 in the circumferential direction of the busbar 60A.

The second grooves 102 may be disposed further inward than the fourth protrusions 230. In addition, the second grooves 102 may be disposed not to overlap the fourth protrusions 230 in a radial direction of the busbar 60A. That is, the second groove 102 may be disposed between the adjacent fourth protrusions 230 in the circumferential direction of the busbar 60A. In addition, the second groove 102 may be disposed not to overlap second busbar bodies 120 in a circumferential direction.

Empty spaces S3 and S4 having predetermined widths in the circumferential direction may be formed by the second busbar bodies 120 of the busbar body 100. The second grooves 102 may be disposed in the empty spaces S3 and S4. The empty spaces S3 and S4 may be spaces formed by separating the second busbar bodies 120 from each other like the spaces S3 of FIG. 13 or may be second grooves of the second busbar bodies 120 concavely formed in a radial direction like the S4 of FIG. 13. The second grooves 102 may be disposed in the empty spaces S3 and S4. Side surfaces of the second busbar bodies 120, which constitute boundaries of the empty spaces S3 and S4, serve to guide the power terminals in a process of coupling the power terminals to the busbar 60A.

An example of the second grooves 102 disposed in the first busbar body 110 is illustrated, the present invention is not limited thereto, and the second grooves 102 may be disposed in the second busbar bodies 110.

Figure 17:
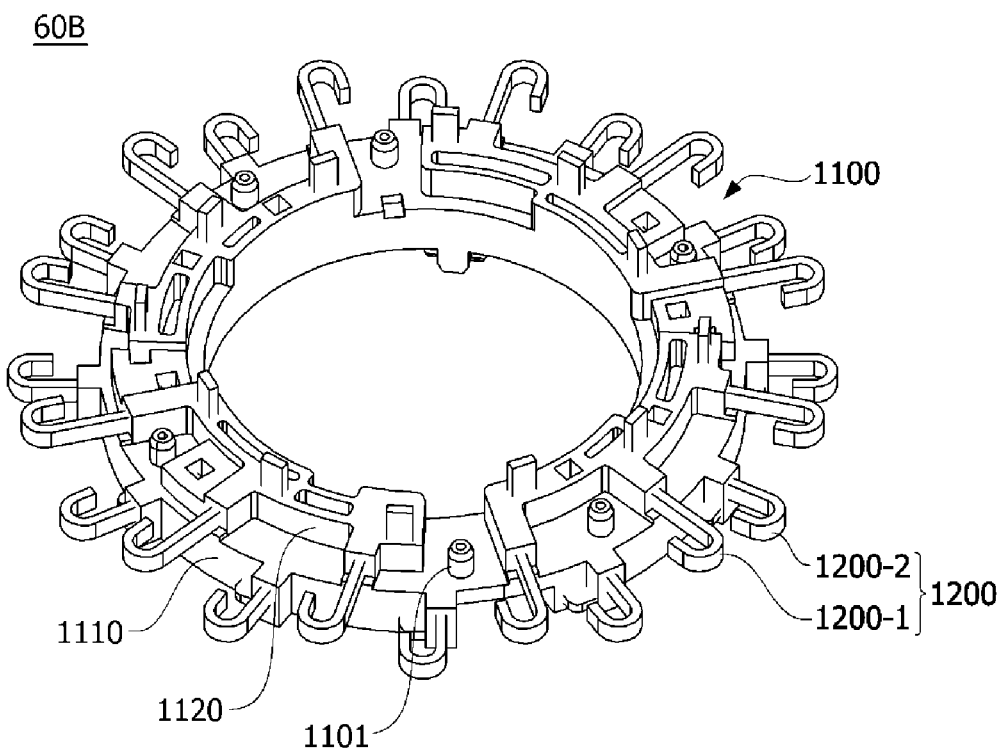
FIG. 17 is a perspective view illustrating a busbar according to a modified embodiment and illustrates fourth protrusions arranged in a circumferential direction.

FIG. 17 is a perspective view illustrating a busbar 60B according to a modified embodiment and illustrates fourth protrusions 1230 arranged in a circumferential direction.

Referring to FIG. 17, the busbar 60B may include a busbar body 1100 and terminals 1200. The terminals 1200 may include phase terminals 1200_1 connected to U-phase, V-phase, and W-phase power sources and neutral terminals 1200_2 connecting the phase terminals 1200_1.

The busbar body 1100 may include a plurality of first protrusions 1101. The plurality of first protrusions 1101 protrude upward from an upper surface of a first busbar body 1110 of the busbar body 1100. The first protrusions 1101 are for arranging positions of power terminals 90A coupled to the busbar 60B.

Figure 18:
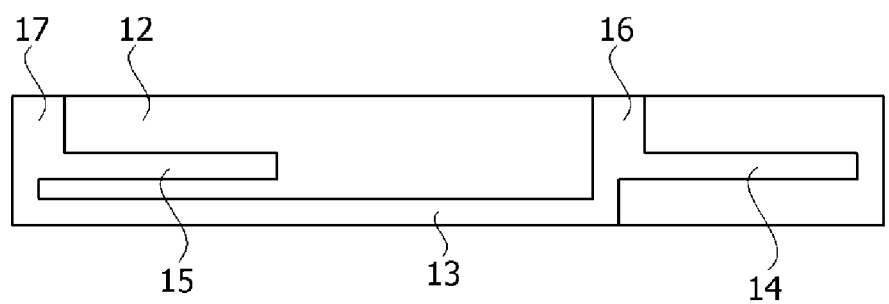
FIG. 18 is a view illustrating a plate member for forming a phase terminal of the busbar.

FIG. 18 is a view illustrating a plate member 12 for forming the phase terminal 1200_1 of the busbar 60B.

Referring to FIG. 18, the plate member 12 may include a first region 13 for forming a terminal body 1210 of the phase terminal 1200_1, a second region 14 and a third region 15 for forming third protrusions 1220 of the phase terminal 1200_1, and a fourth region 16 and a fifth region 17 for forming fourth protrusions 1230 of the phase terminal 1200_1. In this case, the fourth region 16 is positioned at an end of the second region 14, and the fifth region 17 is positioned at an end of the third region 15.

Figure 19:
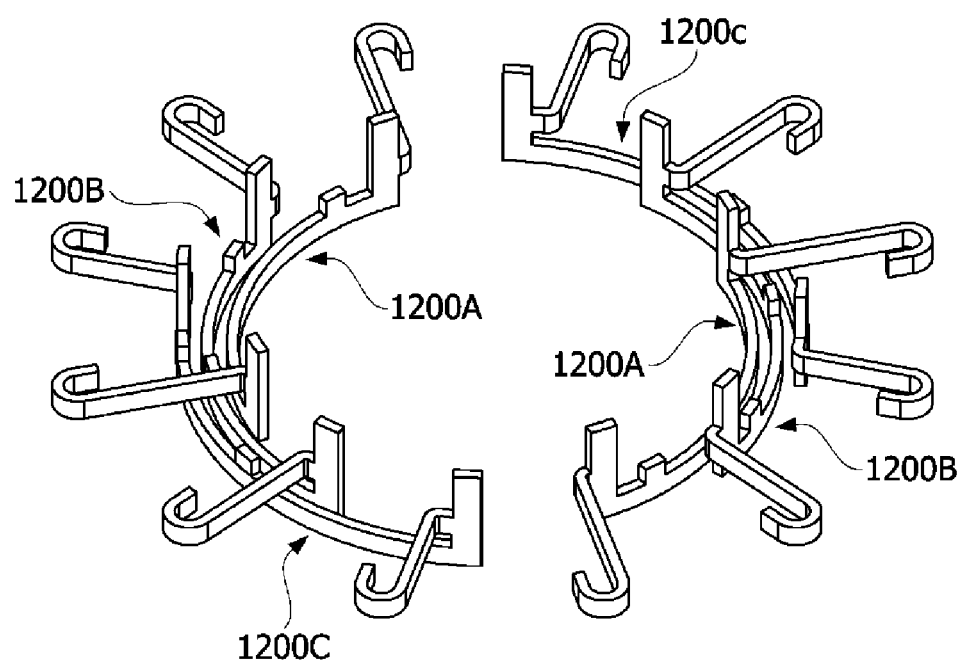
FIG. 19 is a perspective view illustrating phase terminals.
Figure 20:
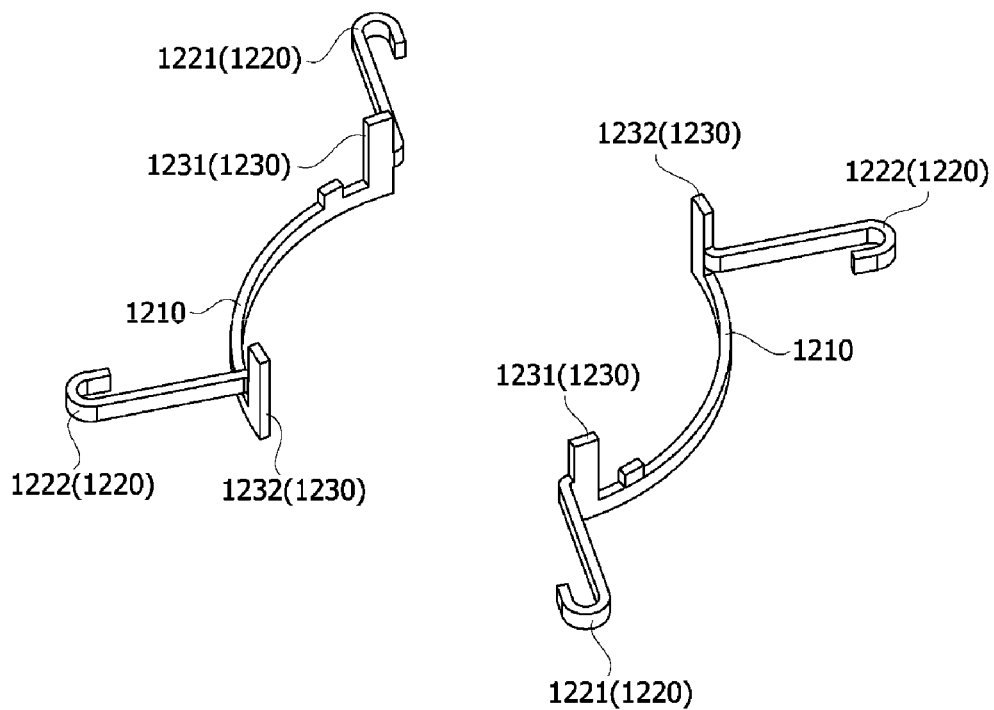
FIG. 20 is a perspective view illustrating first terminals.
Figure 21:
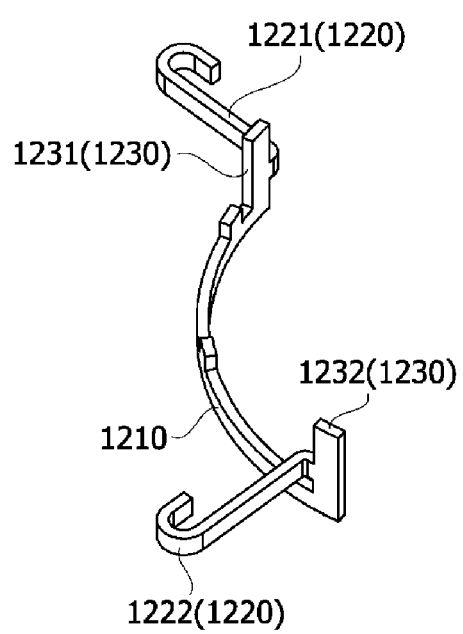
FIG. 21 is a perspective view illustrating second terminals.
Figure 21:
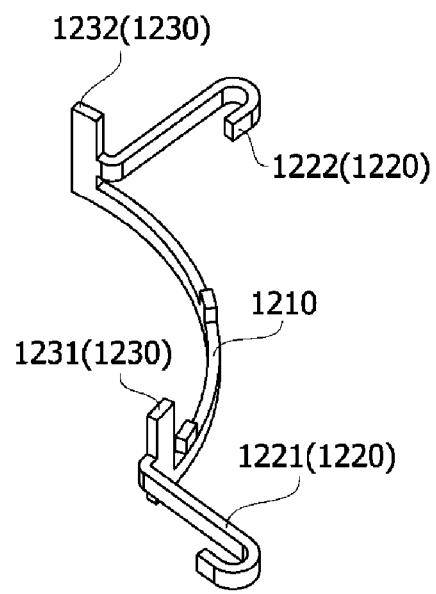
Figure 22:
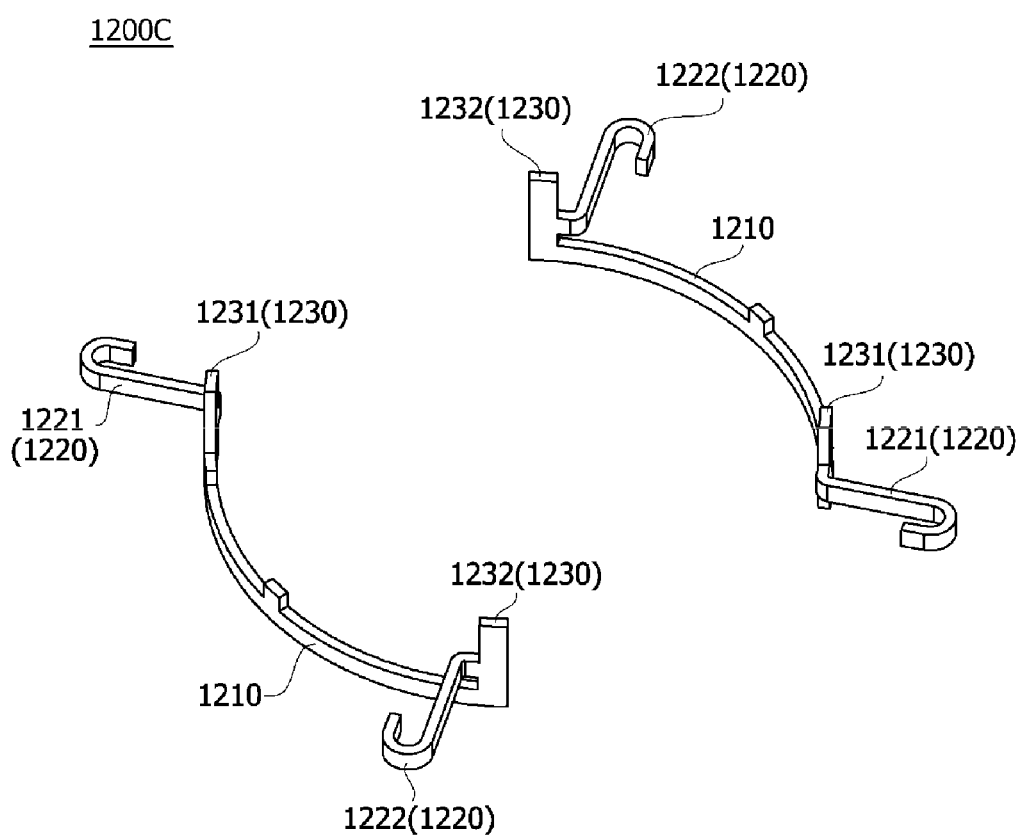
FIG. 22 is a perspective view illustrating third terminals.

FIG. 19 is a perspective view illustrating phase terminals 1200_1, FIG. 20 is a perspective view illustrating first terminals 1200A, FIG. 21 is a perspective view illustrating second terminals 1200B, and FIG. 22 is a perspective view illustrating third terminals 1200C.

Referring to FIGS. 19 to 21, the phase terminals 1200_1 may include the first terminals 1200A, the second terminals 1200B, and the third terminals 1200C connected to U-phase, V-phase, and W-phase power sources. Each of the first terminals 1200A, the second terminals 1200B, and the third terminals 1200C may include the terminal body 1210, the third protrusions 1220, and the fourth protrusions 1230.

The terminal body 1210 of the first terminal 1200A, the terminal body 1210 of the second terminal 1200B, and the terminal body 1210 of the third terminal 1200C may be disposed at different positions in a radial direction of the busbar 60B. Based on the terminal body 1210, the first terminal 1200A, the second terminal 1200B, and the third terminal 1200C may be disposed in order from the inside to the outside.

In addition, the first terminal 1200A, the second terminal 1200B, and the third terminal 1200C may be disposed to include regions overlapping in a radial direction. The first terminal 1200A, the second terminal 1200B, and the third terminal 1200C may be disposed to stand so that widths in a vertical direction are greater than widths in a horizontal direction which correspond to a thickness of the plate member 12.

The third protrusions 1220 are disposed to extend upward from end portions of the terminal body 1210 and to be bent outward in the radial direction. Ends of the third protrusions 1220 are disposed to be bent in hook shapes to surround first end portions (not shown) of coils 30B. The third protrusions 1220 may include a 3-1 protrusion 1221 and a 3-2 protrusion 1222. The 3-1 protrusion 1221 may be disposed at one end portion of the terminal body 1210. The 3-2 protrusion 1222 may be disposed at the other end portion of the terminal body 1210. The 3-1 protrusion 1221 may be connected to the first end portion of the coil 30B. The 3-2 protrusion 1222 may be connected to the first end portion (not shown) of the coil 30B which is the other coil 30B connected to the 3-1 protrusion 1221. Although not illustrated in the drawings, a second end portion of the coil 30B may be connected to the neutral terminal 1200_2.

The fourth protrusions 1230 are disposed to be branched off upward from third protrusions 1220. The fourth protrusions 1230 may be rectangular members having flat surfaces. In addition, the fourth protrusions 1230 may be members of which horizontal cross sections have rectangular shapes, and a direction toward a long side of each of the horizontal cross sections may be a circumferential direction of the busbar 60B. The fourth protrusions 1230 may protrude from connection portions of the third protrusions 1220 and the terminal body 1210. Accordingly, the fourth protrusions 1230 are disposed at one sides of the third protrusions 1220.

The fourth protrusions 1230 may include a 4-1 protrusion 1231 and a 4-2 protrusion 1232. The 4-1 protrusion 1231 may be branched off from the 3-1 protrusion 1221. The 4-2 protrusion 1232 may be branched off from the 3-2 protrusion 1222.

The first terminal 1200A, the second terminal 1200B, and the third terminal 1200C include the terminal bodies 1210, the third protrusions 1220, and the fourth protrusions 1230, and shapes thereof are substantially the same, but lengths of the terminal bodies 1210 in the circumferential direction or lengths of the third protrusions 1220 may be different. However, sizes and shapes of the fourth protrusions 1230 of the first terminal 1200A, the second terminal 1200B, and the third terminal 1200C may be the same. This is for commonly using the phase terminal 1200_1 to correspond to the power terminals 1200 at various positions.

Figure 23:
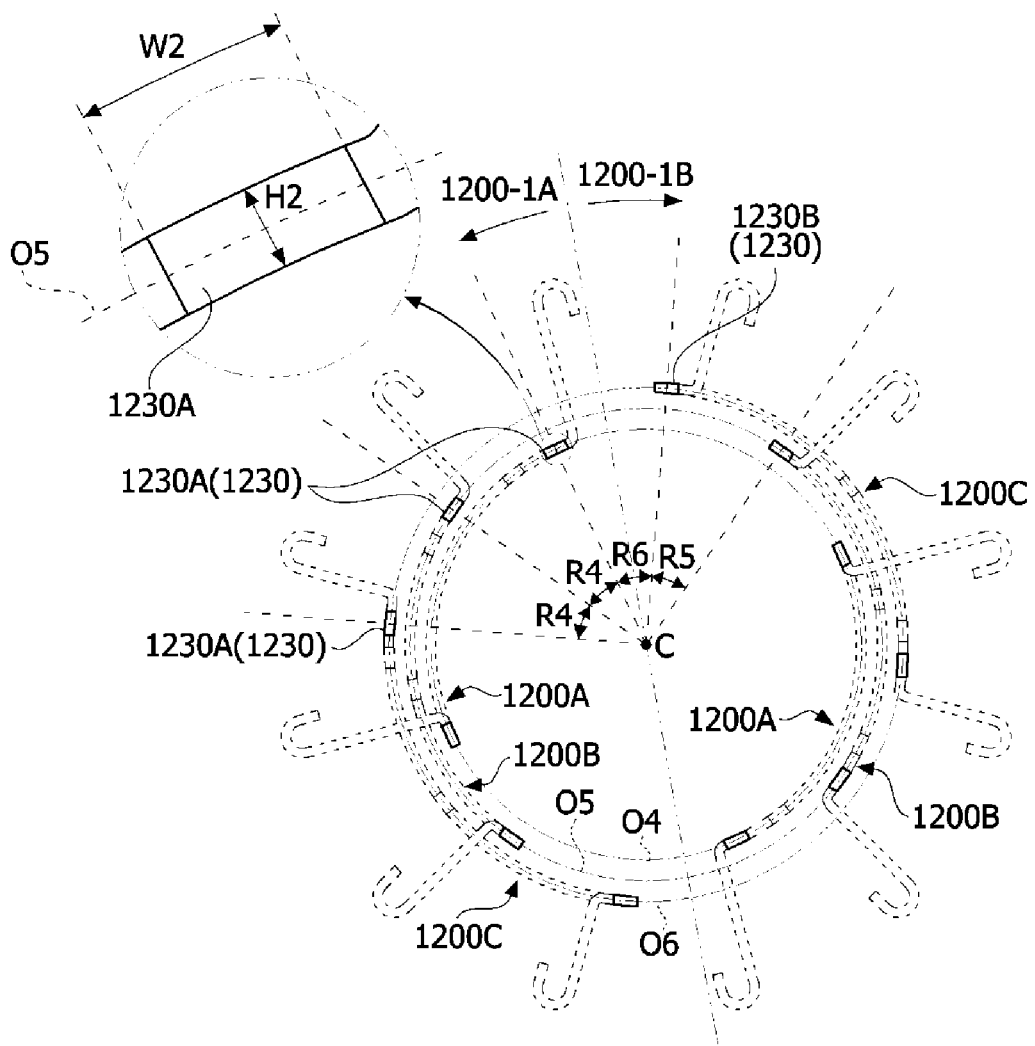
FIG. 23 is a plan view illustrating the phase terminals of the busbar illustrated in FIG. 17.

FIG. 23 is a plan view illustrating the phase terminals 1200_1 of the busbar 60B illustrated in FIG. 17.

Referring to FIG. 23, the plurality of fourth protrusions 1230 disposed on all the phase terminals 1200_1 are disposed at the same position in the radial and vertical directions of the busbar 60B. In addition, the plurality of fourth protrusions 1230 may be disposed at equal intervals in the circumferential direction of the busbar 60B.

For example, the fourth protrusions 1230 are rectangular members of which horizontal cross sections have widths W2 greater than lengths H2. In this case, a direction toward a long side of each of the horizontal cross sections may be the circumferential direction of the busbar 60B.

Some of the plurality of fourth protrusions 1230 may be disposed at different positions from the other fourth protrusions 1230 of the busbar 60B in the radial direction. For example, based on a center C of the busbar 60B, the fourth protrusions 1230 may be disposed to overlap the terminal bodies 1210. Specifically, the plurality of fourth protrusions 1230 disposed on the same terminal body 1210 may be disposed on the same circumference based on the center of the busbar 60B.

Accordingly, the plurality of fourth protrusions 1230 disposed on the first terminals 1200A may be disposed on a first circumference O4 based on the center C of the busbar 60B. The plurality of fourth protrusions 1230 disposed on the second terminals 1200B may be disposed on a second circumference O5 based on the center C of the busbar 60B. The plurality of fourth protrusions 1230 disposed on the third terminals 1200C nay be disposed on a third circumference O6 based on the center C of the busbar 60B. The first circumference O4, the second circumference O5, and the third circumference O6 have different radii.

The plurality of fourth protrusions 1230 may be disposed at equal intervals in the circumferential direction of the busbar 60B. For example, the phase terminals 1200_1 may be divided into the phase terminals 1200_1 of a first group 1200_1A (hereinafter, referred to as the first group 1200_1A) and the phase terminals 1200_1 of a second group 1200_1B (hereinafter, referred to as the second group 1200_1B) which are electrically separated. The first group 1200_1A and the second group 1200_1B may be disposed to be divided with respect to a virtual straight line passing through the center C of the busbar 60B. In addition, the first group 1200_1A and the second group 1200_1B may be disposed to be rotationally symmetrical with respect to the center C of the busbar 60B. Alternatively, the first group 1200_1A and the second group 1200_1B may also be symmetrically disposed with respect to the virtual straight line passing through the center C of the busbar 60B.

In this case, a fourth angle R4 of the first group 1200_1A may be the same as a fifth angle R5 of the second group 1200_1B. In this case, the fourth angle R4 is an angle which denotes a gap between the fourth protrusions 1230 of the phase terminals 1200_1 of the first group 1200_1A in the circumferential direction, and the fifth angle R5 is an angle which denotes a gap between the fourth protrusions 2230 of the phase terminals 1200_1 of the second group 1200_1B in the circumferential direction. A reference for each of the fourth angle R4 and the fifth angle R5 corresponds to a width center of the horizontal cross section of each of the second protrusions 1230 in the circumferential direction.

A sixth angle R6 between the first group 1200_1A and the second group 1200_1B may also be the same as the fourth angle R4 or the fifth angle R5. In this case, the sixth angle R6 is an angle which denotes a gap between a second protrusion 1230A of the first group 1200_1A and a second protrusion 1230B of the second group 1200_1B which are adjacent to each other in the circumferential direction. A reference for the sixth angle R6 corresponds to the width center of the horizontal cross section of each of the fourth protrusions 1230 in the circumferential direction.

Figure 24:
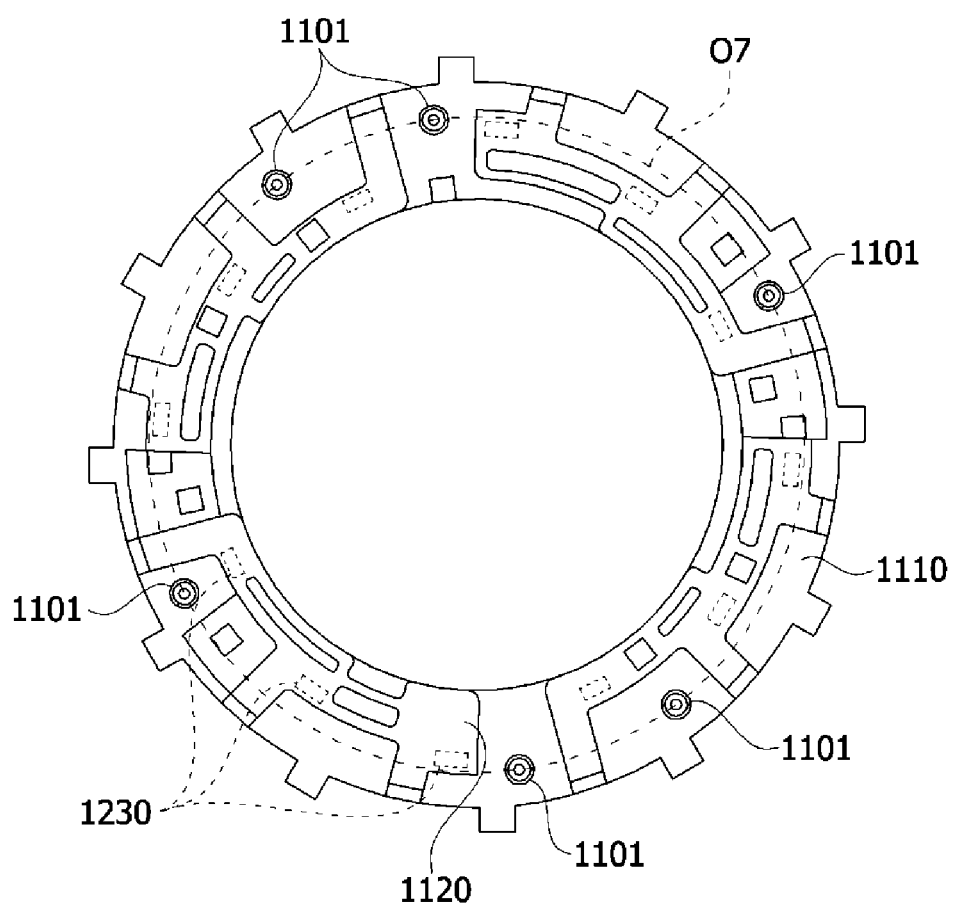
FIG. 24 is a plan view illustrating the busbar body illustrated in FIG. 17.

FIG. 24 is a plan view illustrating the busbar body 1100 illustrated in FIG. 17.

Referring to FIGS. 17 and 24, the plurality of first protrusions 1101 protrude upward from the upper surface of the first busbar body 1110 of the busbar body 1100. The first protrusions 1101 may be coupled to a body surrounding the power terminals. The first protrusions 1101 are for arranging positions of the power terminals coupled to the busbar 60B and the fourth protrusions 1230. The first protrusions 1101 may have cylindrical shapes, and upper end portions of the first protrusions 1101 may have cone shapes.

Centers of the plurality of first protrusions 1101 may be disposed on the same circular orbit O7 based on the center C of the busbar 60B. This is for commonly using the second terminal 1200B to correspond to the positions of the various power terminals.

The first protrusions 1101 may be disposed further inward than the fourth protrusions 1230 in the radial direction of the busbar 60B. Each of the first protrusions 1101 may be disposed between the adjacent fourth protrusions 1230 in the circumferential direction of the busbar 60B.

Figure 25:
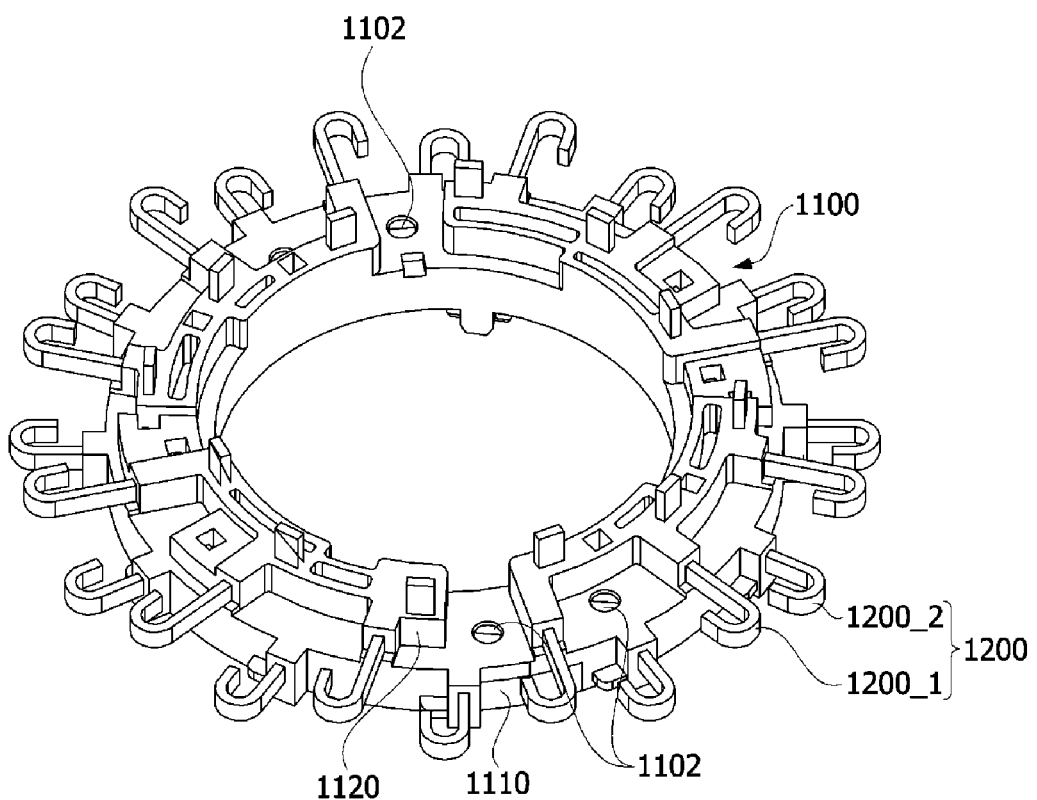
FIG. 25 is a view illustrating a busbar including first grooves instead of the first protrusions in the busbar body illustrated in FIG. 17.
Figure 26:
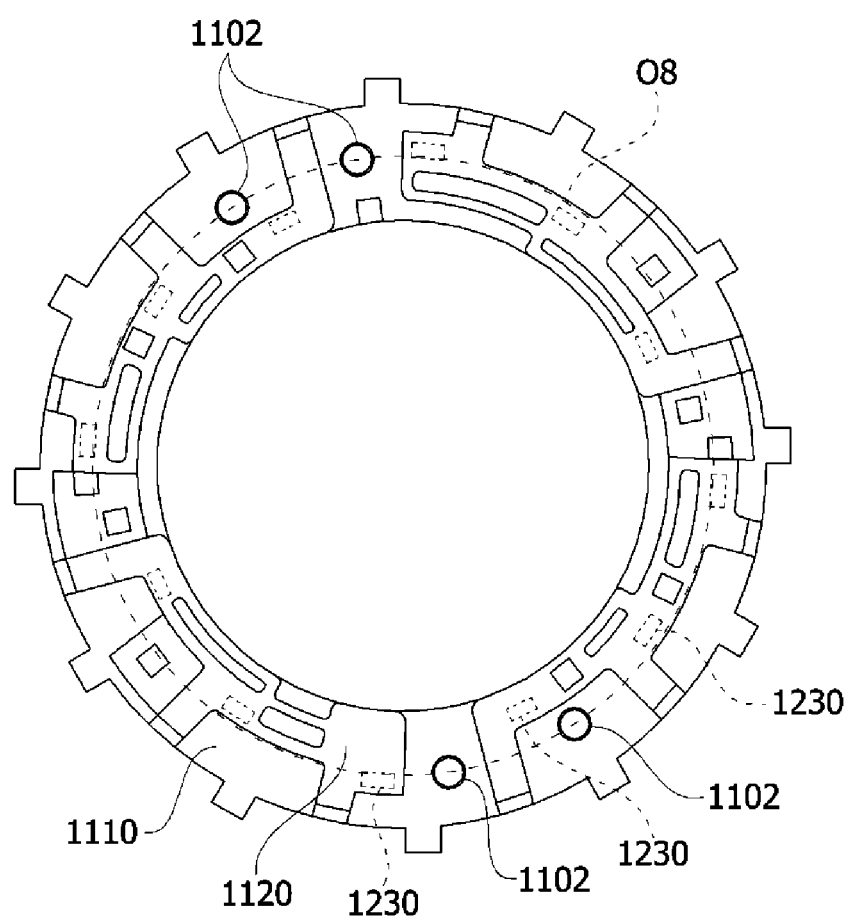
FIG. 26 is a plan view illustrating the busbar body illustrated in FIG. 25.

FIG. 25 is a view illustrating the busbar 60B including first grooves 1102 instead of the first protrusions 1101 in the busbar body 1100, and FIG. 26 is a plan view illustrating the busbar body 1100 illustrated in FIG. 25.

Referring to FIGS. 25 and 26, the busbar 60B may include the first grooves 1102 instead of the first protrusions 1101. The busbar body 1100 may include the plurality of first grooves 1102. The plurality of first grooves 1102 may be concavely formed in an upper surface of the busbar body 1100. The first grooves 1102 may be coupled to protruding structures of the body surrounding the power terminals. The first grooves 1102 are also for arranging the positions of the power terminals coupled to the busbar 60B and the fourth protrusions 230. Centers of the plurality of first grooves 1102 may be disposed on the same orbit O8 about the center C of the busbar 60B. Each of the first grooves 1102 may be disposed between the adjacent fourth protrusions 1230 in the circumferential direction of the busbar 60B.

The first grooves 1102 may be disposed not to overlap the fourth protrusions 1230 in the radial direction of the busbar 60B. That is, each of the first grooves 1102 may be disposed between the adjacent fourth protrusions 1230 in the circumferential direction of the busbar 60B. In addition, the first grooves 102 may be disposed not to overlap second busbar bodies 1120 in the circumferential direction.

Figure 27:
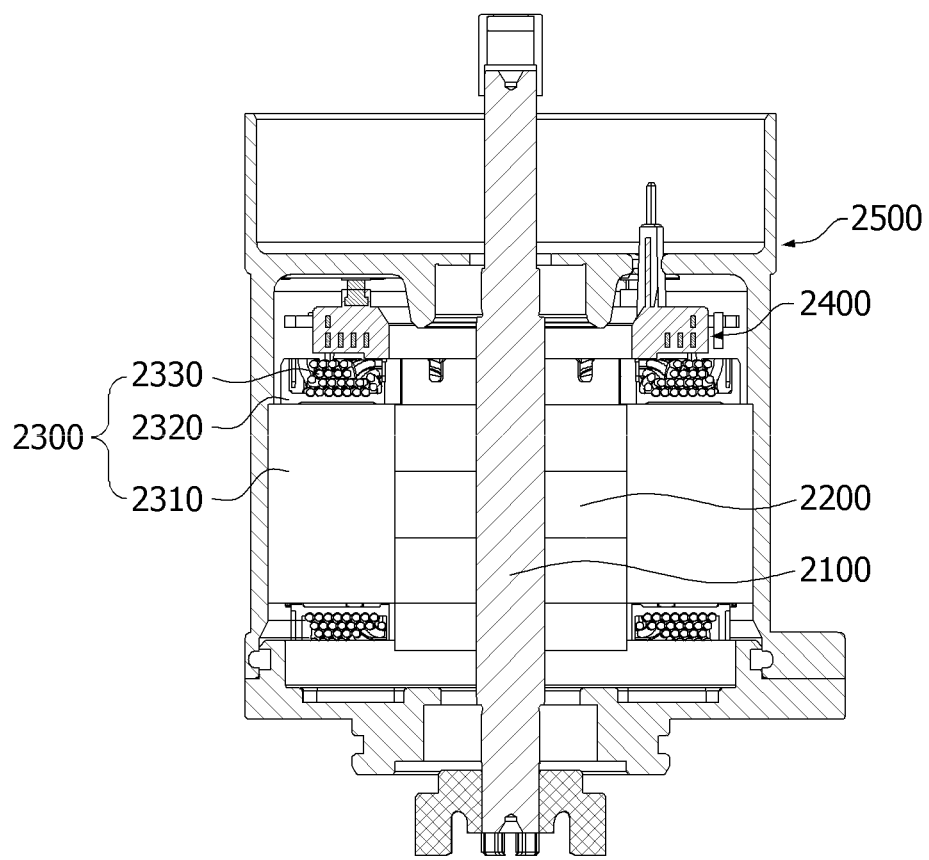
FIG. 27 is a side cross-sectional view illustrating a motor according to an embodiment.
Figure 28:
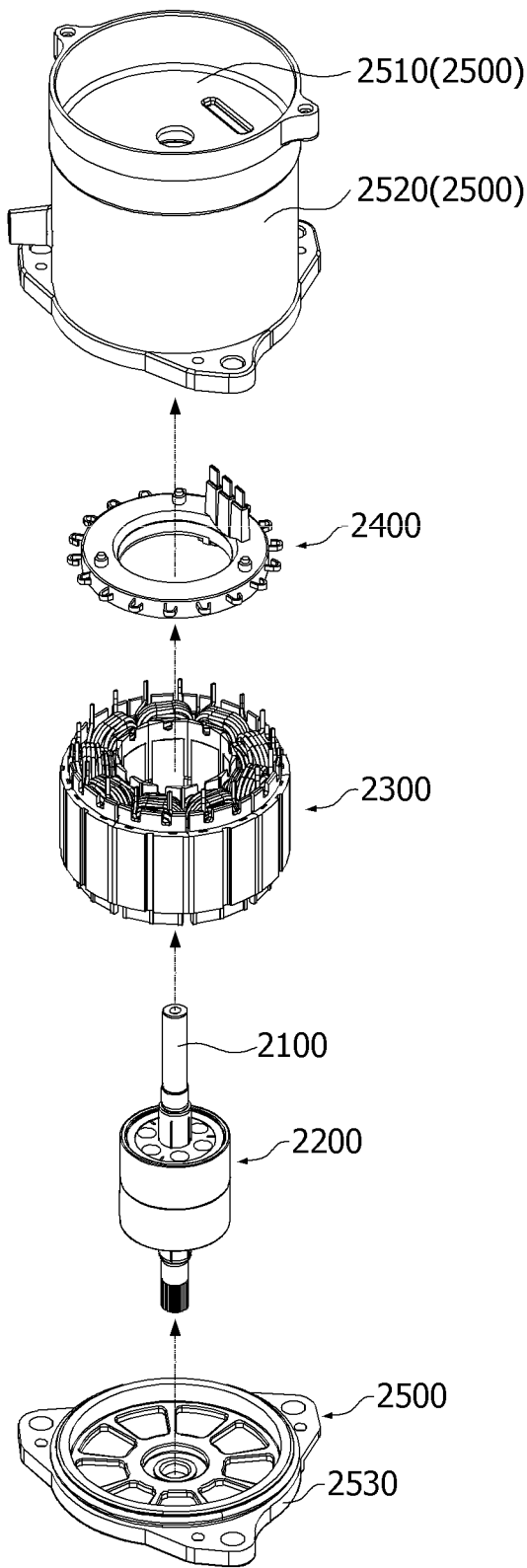
FIG. 28 is an exploded perspective view illustrating the motor according to the embodiment.

FIG. 27 is a side cross-sectional view illustrating a motor according to an embodiment of the present invention, and FIG. 28 is an exploded perspective view illustrating the motor according to the embodiment of the present invention.

Referring to FIG. 27, the motor according to the embodiment may include a shaft 2100, a rotor 2200, a stator 2300, a busbar 2400, and a housing 2500. Hereinafter, the term "inward" is a direction from the housing 2500 toward the shaft 2100 which is a center of the motor, and the term "outward" is a direction opposite to "inward," that is, a direction from the shaft 2100 toward the housing 2500. In addition, a circumferential direction or radial direction is defined based on an axial center.

The shaft 2100 may be coupled to the rotor 2200. When an electromagnetic interaction occurs between the rotor 2200 and the stator 2300 when a current is supplied, the rotor 2200 rotates, and the shaft 2100 rotates in conjunction with the rotor 2200. The shaft 2100 may be connected to a steering apparatus of a vehicle and transmit power to the steering apparatus.

The rotor 2200 is disposed outside the shaft 2100. The rotor 2200 rotates due to an electrical interaction with the stator 2300. The rotor 2200 may include a rotor core and magnets. The rotor core may be formed in a form in which a plurality of circular thin steel plates are stacked or formed in one container shape. A hole to which the shaft 2100 is coupled may be disposed in a central portion of the rotor core. The magnets may be disposed on an outer surface of the rotor core or in the rotor core.

The stator 2300 is disposed outside the rotor 2200. The stator 2300 may include a stator core 2310, an insulator 2320, and coils 2330. The insulator 2320 is installed on the stator core 2310. The coils 2330 are wound around the insulator 2320. The coils 2330 induce an electrical interaction with the rotor 2200.

The busbar 2400 is disposed above the stator 2300. The busbar 2400 includes a body formed of an insulation material and a plurality of terminals coupled to the body. In this case, the body is formed of the insulation material to serve to inhibit connections between the plurality of terminals. In addition, the plurality of terminals connect the coils 2330 wound around the stator core 2310 and serve to apply a current to the coils.

The housing 2500 may include the rotor 2200, the stator 2300, and the busbar 2400 therein. The housing 2500 may include a first part 2510, a second part 2520, and a third part 2530. The first part 2510 may be disposed above the busbar 2400. In addition, the second part 2520 may be disposed outside the busbar 2400 and the stator 2300. The third part 2530 may be disposed under the stator 2300. The first part 2510 and the second part 2520 may be integrally formed. In addition, the third part 2530 may be coupled to a lower end portion of the second part 2520. However, the second part and the third part may be integrally formed, and the first part may also be formed on an upper end of the second part.

Figure 29:
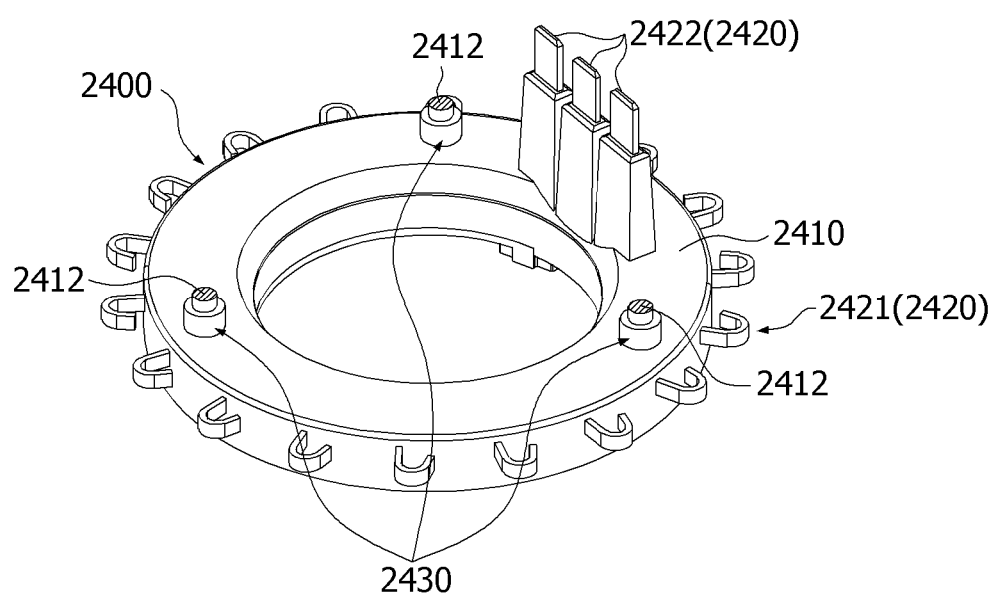
FIG. 29 is a perspective view illustrating a busbar.
Figure 30:
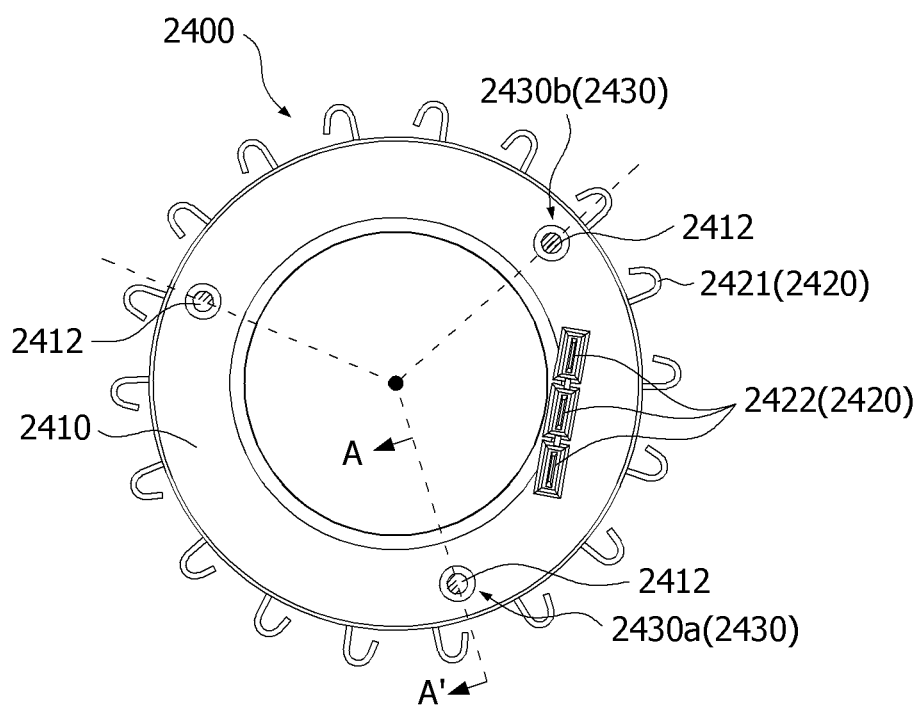
FIG. 30 a plan view illustrating the busbar.
Figure 31:
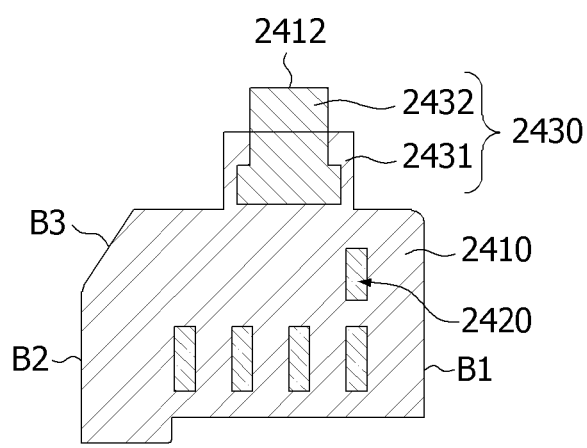
FIG. 31 is a cross-sectional view along line AA' of FIG. 30.

FIG. 29 is a perspective view illustrating the busbar, FIG. 30 a plan view illustrating the busbar, and FIG. 31 is a cross-sectional view along line AA' of FIG. 30.

Referring to FIG. 3, the busbar 2400 may include a body 2410, terminals 2420, and protrusions 2430.

The body 2410 forms an exterior of the busbar 2400. The body 2410 may be an annular mold member. In this case, the body 2410 may be formed of an insulation material. The body 2410 insulates the plurality of terminals 2420 from each other. The terminals 2420 are coupled to the body 2410. In this case, the terminals 2420 may include first terminals 2421 and second terminals 2422.

A hole may be formed in the body 2410. Referring to FIG. 31, the body 2410 may include a first side surface B1 and a second side surface B2. The first side surface B1 and the second side surface B2 are disposed apart from each other in a radial direction. In addition, the first side surface B1 faces outward, and the second side surface B2 faces inward. In addition, a third side surface B3 is disposed between the second side surface B2 and an upper surface of the body 2410. The third side surface B3 may be disposed to be inclined.

A guide member 2411 may be disposed on an upper surface of the body 2410. The guide member 2411 may extend from the upper surface of the body 2410 in an axial direction. The plurality of second terminals 2422 may be disposed on the guide member 2411. The plurality of second terminals 2422 may be disposed apart from each other. In this case, the second terminals 2422 may be formed to be longer than the guide member 2411 in the axial direction. In addition, upper ends of the second terminals 2422 may be disposed at a higher level than an upper end of the guide member 2411. The plurality of second terminals 2422 and the guide member 2411 may be exposed upward from the housing 2500. The first terminals 2421 and the second terminals 2422 may be integrally formed. The second terminals 2422 may be bent to be perpendicular to the first terminals 2421.

Referring to FIG. 30, a first support surface 2412 may be disposed above the upper surface of the body 2410. The support surface 2412 may be provided as a plurality of first support surfaces 2412. The plurality of first support surfaces 2412 may be spaced apart from each other. The plurality of first support surfaces 2412 may be spaced apart from an axial center. In this case, the plurality of first support surfaces 2412 may have the same separation distance from the axial center. The plurality of first support surfaces 2412 may overlap in a circumferential direction. The first support surfaces 2412 may be in contact with the housing 2500. For example, the first support surfaces 2412 may be in contact with the first part 2510. In this case, second support surfaces 2513 corresponding to positions of the first support surfaces 2412 may be formed on the first part 2510.

Referring to FIG. 3 again, the terminals 2420 may include the first terminals 2421 and the second terminals 2422. The first terminals 2421 and the second terminals 2422 may only be described separately according to shapes and functional features and may be one member in which the first terminals 2421 and the second terminals 2422 are vertically connected. Meanwhile, the first terminals 2421 and the second terminals 2422 may be separate members. In this case, when the first terminals 2421 and the second terminals 2422 are separate members, the first terminals 2421 and the second terminals 2422 may be coupled by fusing.

The first terminals 2421 and the coils 2330 may be electrically connected. The plurality of first terminals 2421 may be provided. The number of the plurality of first terminals 2421 may be three. The plurality of first terminals 2421 may be coupled to the body 2410. The plurality of first terminals 2421 may include bodies and protruding parts. The bodies may be disposed in an annular shape based on the axial center. The protruding parts may be connected to outer sides of the bodies. A plurality of protruding parts may be connected to one body. In this case, the body and the protruding parts may be one member. In addition, the protruding parts may be exposed from a side surface of the body 2410. In this case, connection ends the first terminals 2421 and the coil 2330 may be fused and electrically connected.

The second terminals 2422 are connected to a power source. In addition, the second terminals 2422 are connected to the first terminals 2421 for applying power to the first terminals 2421. The plurality of second terminals 2422 may be provided. The number of the plurality of second terminals 2422 may be three. The second terminals 2422 may be connected to the U-phase, V-phase, and W-phase power sources. The plurality of second terminals 2422 may extend in the axial direction. The plurality of second terminals 2422 may protrude from the upper surface of the body 2410.

The protrusions 2430 may be disposed on the upper surface of the body 2410. The protrusions 2430 may be coupled to the body 2410 by injection molding. The protrusions 2430 may be disposed between the first side surface B1 and the second side surface B2 in the radial direction. In addition, the protrusions 2430 may be disposed further outward than the third side surface B3. The protrusions 2430 may be disposed a distance apart from the first side surface B1 in the radial direction. In addition, the protrusions 2430 may also be disposed a distance apart from the second side surface B2 in the radial direction. In this case, the protrusions 2430 may be disposed to be closer to the first side surface B1 than the second side surface B2. The first support surfaces 2412 may be disposed on end surfaces of the protrusions 2430. The first support surfaces 2412 are in contact with the first part 2510. In this case, a separation distance between the body 2410 and the first part 2510 may be maintained a length of each of the protrusions 2430 in the axial direction.

The plurality of protrusions 2430 may be provided. Heights of the end surfaces of the plurality of protrusions 2430 may be the same. That is, heights of the plurality of first support surfaces 2412 may be the same in the axial direction. In this case, the first support surfaces 2412 are disposed at lower positions than upper ends of the second terminals 2422. The plurality of protrusions 2430 may be spaced apart from each other in the circumferential direction. The plurality of protrusions 2430 may be disposed at equal intervals. The plurality of protrusions 2430 may be spaced apart from the axial center. In this case, distances from the plurality of protrusions 2430 to the axial center may be the same. The plurality of protrusions 2430 may overlap in the circumferential direction. The number of the plurality of protrusions 2430 may be three. Three protrusions 2430 may be disposed to be spaced at intervals of 120 degrees based on the axial center. In this case, the second terminals 2422 may be disposed between any one protrusion 2430a and another protrusion 2430b among three protrusions 2430 in the circumferential direction.

FIG. 31 is the cross-sectional view along line AA' of FIG. 30.

Referring to FIG. 31, each of the protrusions 2430 may include a first member 2431 and a second member 2432.

The first member 2431 may extend from the upper surface of the body 2410. The first member 2431 may be formed of the same material as the body 2410. The first member 2431 and the body 2410 may be an integrated molding member. A groove may be formed inside the first member 2431. In addition, the second member 2432 may be disposed in the groove of the first member 2431. The second member 2432 may be formed of a different material from the first member 2431 or the body 2410. In this case, an end surface of the second member 2432 may be disposed at a higher level than an end surface of the first member 2431. In addition, the end surface of the second member 2432 may be in contact with the first part 2510. In this case, the end surface of the second member 2432 is in contact with the first part 2510 so that the body 2410 may have the separation distance from the first part 2510.

Figure 32:
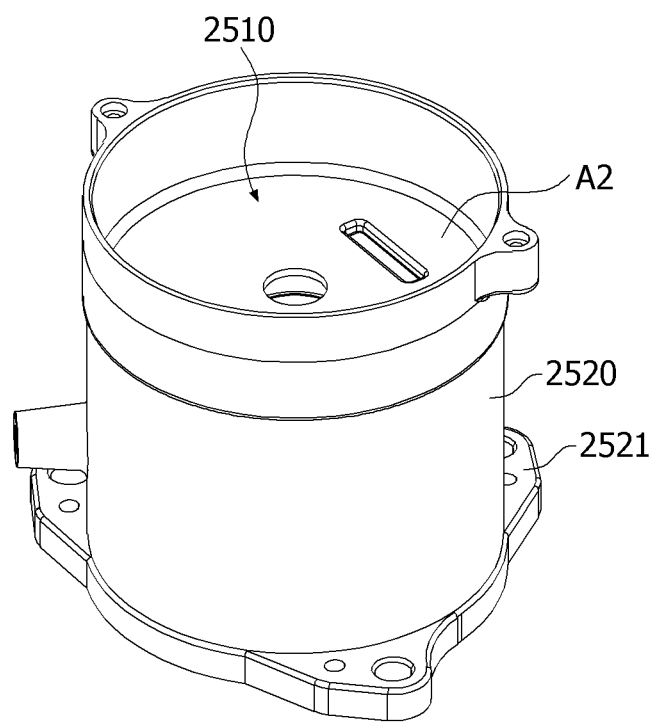
FIG. 32 is a perspective view illustrating a first part and a second part.
Figure 33:
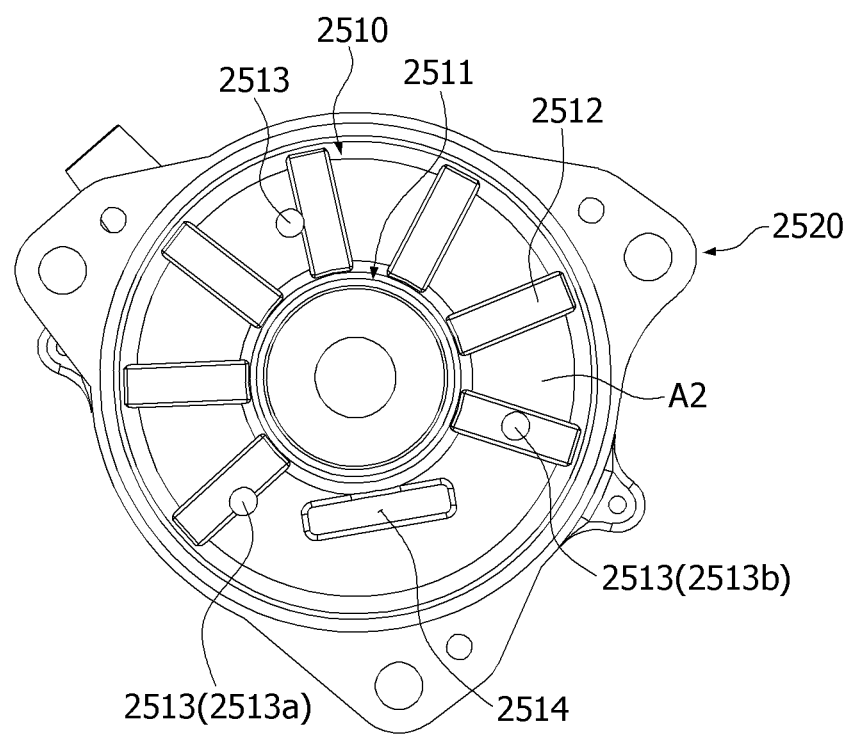
FIG. 33 is a bottom view illustrating the first part and the second part.

FIG. 32 is a perspective view illustrating the first part and the second part, and FIG. 33 is a bottom view of FIG. 32.

Referring to FIG. 32, the first part 2510 and the second part 2520 may be one part. In this case, the first part 2510 may have a disc shape. In addition, the second part 2520 may have a cylindrical shape. The first part 2510 may be disposed in the second part 2520. A coupling part 2521 may be formed on the lower end portion of the second part 2520. In this case, the third part 2530 may be coupled to the coupling part 2521. In addition, referring to FIGS. 32 and 33, the first part 2510 may include a first surface A1 and a second surface A2. The first surface A1 and the second surface A2 are vertically disposed. In this case, the first surface A1 faces the busbar 2400. In addition, the second surface A2 faces an opposite side of the first surface A1. The first surface A1 faces downward, and the second surface A2 faces upward.

A bearing pocket part 2511, a plurality of ribs 2512, second support surfaces 2513, and a hole 2514 may be formed in the first part 2510. The bearing pocket part 2511 may be disposed in a central portion of the first part 2510. A shaft hole may be formed in a central portion inside the bearing pocket part 2511. In this case, an upper bearing may be disposed in the bearing pocket part 2511. The upper bearing rotatably supports an upper end portion of the shaft 2100.

The plurality of ribs 2512 are disposed between the bearing pocket part 2511 and the second part 2520 in the radial direction. The plurality of ribs 2512 may be radially disposed based on the axial center. Distances between the plurality of ribs 2512 may be different from each other. The hole 2514 may be disposed between any one rib 2512 and another rib 2512 among the plurality of ribs 2512. The guide member 2411 and the second terminals 2422 may pass through the hole 2514.

The second support surfaces 2513 may be formed on the first surface A1. The second support surfaces 2513 may be disposed above the body 2410. The second support surfaces 2513 and the body 2410 may overlap in the axial direction. The plurality of second support surfaces 2513 may be provided. The plurality of second support surfaces 2513 may be spaced apart from each other. A separation distance between the plurality of second support surfaces 2513 may be smaller than a separation distance between the plurality of ribs 2512. The plurality of second support surfaces 2513 have the same height in the axial direction. The second support surfaces 2513 may be flat surfaces. The second support surfaces 2513 may be formed to overlap the ribs 2512. The second support surfaces 2513 may protrude further downward than the ribs 2512. Meanwhile, although not illustrated in the drawings, the second support surfaces 2513 may be recessed further upward than the ribs 2512 or the first surface A1.

The number of the plurality of second support surfaces 2513 may be three. Three second support surfaces 2513 may be disposed to be spaced at intervals of 120 degrees in the axial center. The three second support surfaces 2513 are formed to correspond to positions of the three first support surfaces 2412. In addition, among the second support surfaces 2513, the hole 2514 may be disposed between one support surface 2513*a* and another support surface 2513*b* in the circumferential direction. The hole 2514 may be formed to correspond to a position of the guide member 2411.

The second support surfaces 2513 may be formed wider than the first support surfaces 2412. Each of the second support surfaces 2513 may have a circular shape. The first support surface 2412 may be the end surface of the protrusion 2430. A diameter of the second support surface 2513 may be greater than a diameter of the end surface of the protrusion 2430. A design of the second support surface 2513 may be changed to one of various shapes instead of the circular shape. In this case, a center of the second support surface 2513 may be disposed to be coaxial with a center of the first support surface 2412. Meanwhile, the center of the second support surface 2513 may be disposed to be misaligned with a center of the first support surface 2412 in the axial direction. Accordingly, even when a certain error occurs between the center of the second support surface 2513 and a center of the protrusion 2430 while the busbar 2400 is inserted into the housing 2500, end surfaces of the second support surface 2513 and the first support surface 2412 may come into contact with each other.

Figure 34:
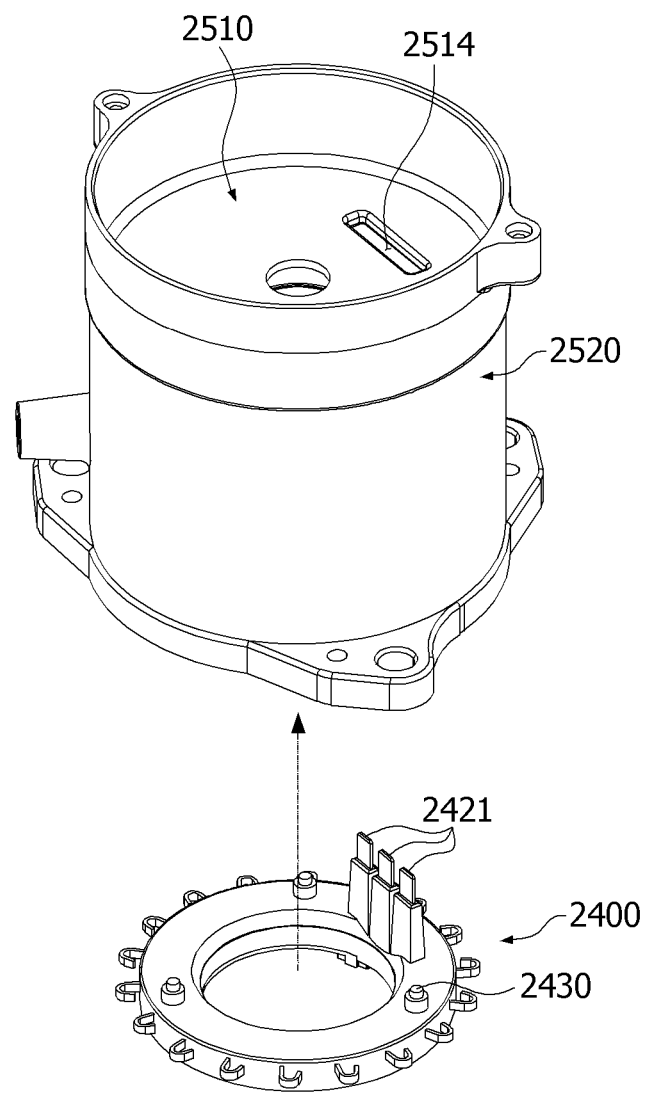
FIG. 34 is an exploded perspective view illustrating a state in which the busbar and a housing are coupled.

FIG. 34 is an exploded perspective view illustrating a state in which the busbar and the housing are coupled.

Referring to FIG. 34, the first part 2510 and the second part 2520 form an inner surface having a cylindrical shape. In this case, an upper side of the inner space may be closed by the first part 2510. In addition, a lower side of the inner space may be open. In addition, the busbar 2400 is inserted into the inner space. In this case, the bus bar 2400 may be disposed at an upper portion of the inner space. In this case, the protrusion 2430 is in contact with the second support surface 2513. The body 2410 is spaced apart from the first part 2510. In addition, the second terminals 2422 pass through the hole 2514 and are exposed from the housing 2500.

Figure 35:
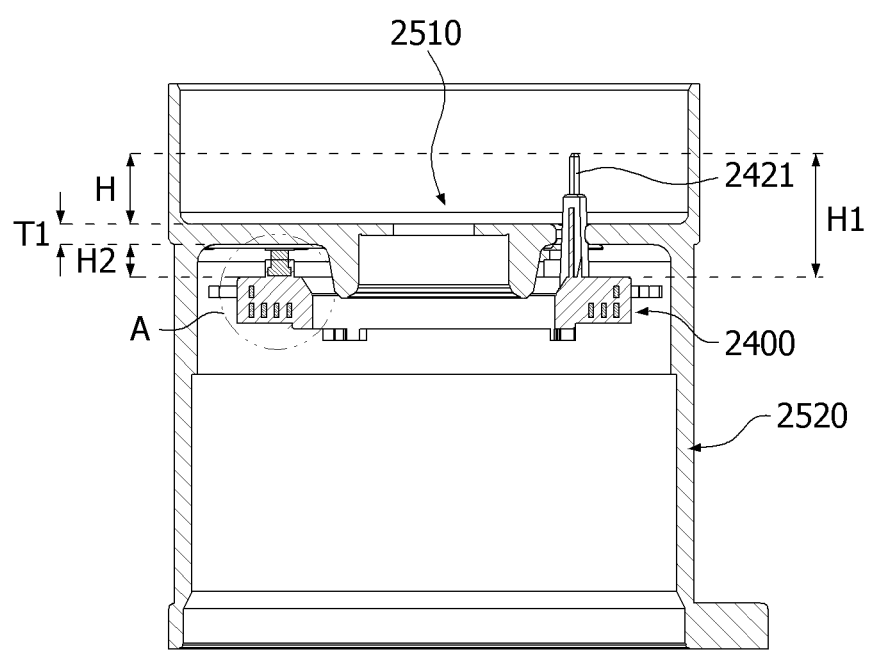
FIG. 35 is a side cross-sectional view illustrating the state in which the busbar and the housing are coupled.
Figure 36:
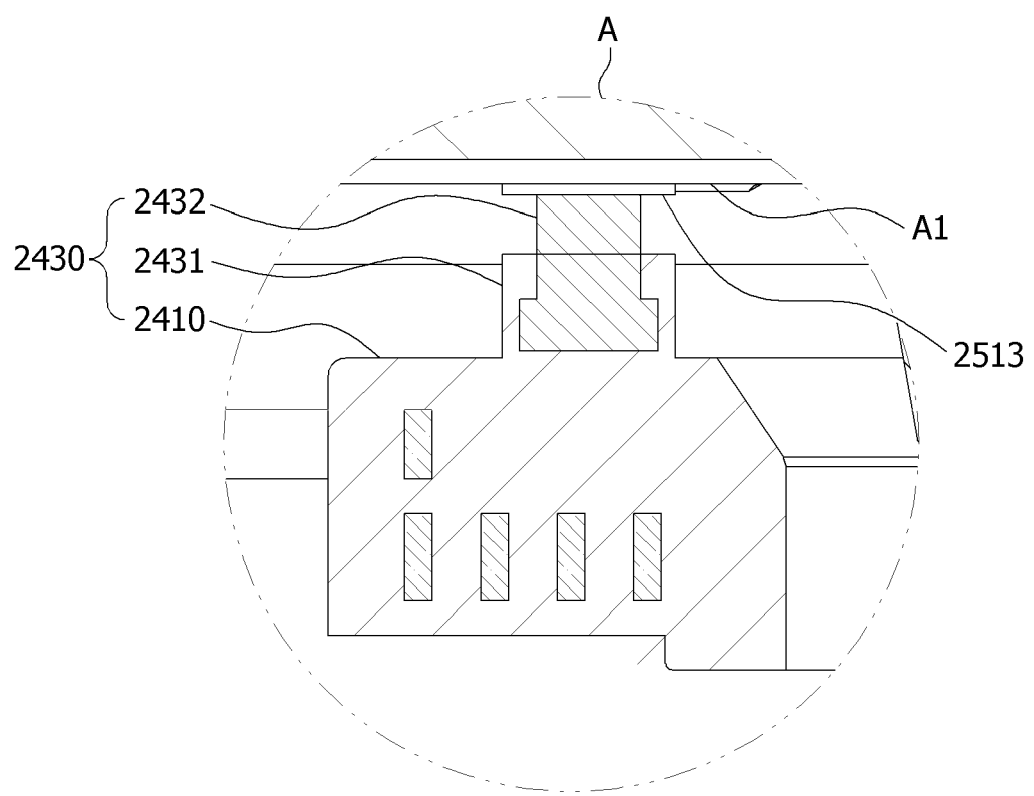
FIG. 36 is an enlarged view illustrating region A.

FIG. 35 is a side cross-sectional view illustrating the state in which the busbar and the housing are coupled, and FIG. 36 is an enlarged view illustrating region A.

Referring to FIG. 35, the end surface of the protrusion 2430 is in contact with the second support surface 2513. In addition, the second support surface 2513 of the first surface A1 is spaced apart from the upper surface of the body 2410 in the axial direction. In addition, the second terminals 2422 are disposed above the first part 2510. Each of the second terminals 2422 is disposed at a predetermined height H from the first part 2510. In this case, the height H of the upper end of the second terminal 2422 may be determined depending on a length H2 of the protrusion 2430 in the axial direction. In this case, the height H of the second terminal 2422 exposed from the housing 2500 is the same as a length calculated by subtracting the length H2 of the protrusion 2430 in the axial direction and a thickness T1 of the first part 2510 from a length H1 of the second terminal 2422 in the axial direction. In this case, the height of the second terminal 2422 may be adjusted by changing the length H2 of the protrusion 2430 in the axial direction through design. In this case, the second terminal 2420 may be connected to an external power source. In the motor according to the embodiment of the present invention, a power connection portion of the terminal is guided to a regular position, and thus a change in position of the terminal power connection portion due to a cumulative tolerance can be inhibited.

Meanwhile, although not illustrated in the drawings, in the motor according to the embodiment, a plurality of protrusions may be formed on the first part 2510. In this case, a length of each of the protrusions in the axial direction may be the same as a distance between the first part 2510 and the upper surface of the body 2410 in the axial direction. In addition, the second support surface may be disposed on an upper surface of the protrusion. In addition, the plurality of first support surfaces in contact with the second support surfaces may be disposed on the upper surface of the body 2410. In this case, heights of the upper surface of the body 2410 and the height of the first support surface in the axial direction may be the same.

Conversely, in the motor according to the embodiment, at least one first protrusion may be formed on the busbar 2400. In addition, at least one second protrusion corresponding to a position of the first protrusion may be formed on the first part 2510. In this case, a first support surface may be disposed on an end surface of the first protrusion. In addition, a second support surface may be disposed on an end surface of the second protrusion. In this case, the sum of lengths of the first protrusion and the second protrusion in the axial direction may be the same as the distance between the first part 2510 and the upper surface of the body 2410 in the axial direction.

In the motor according to the embodiment, while the busbar is inserted into the housing, the busbar comes into contact with an inner surface of the housing so that the busbar can be disposed at a regular position. In addition, the power connection portion of the terminal can be guided to the regular position, a change in position of the power connection portion of the terminal due to a cumulative tolerance can be inhibited. Accordingly, defects of the motor due to a connection failure of the power terminal can be reduced.

In the above-described embodiments, an example of an inner rotor type motor has been described, but the present invention is not limited thereto. The present invention may also be applied to an outer rotor type motor. In addition, the present invention may be used in various devices for vehicles, home appliances, or the like.

The invention claimed is:

1. A motor comprising:
 a shaft;
 a rotor coupled to the shaft;
 a stator disposed outside the rotor;
 a busbar disposed above the stator; and
 a power terminal unit coupled to the busbar connected to a coil,
 wherein the power terminal unit includes a first groove,
 the busbar includes a busbar body and a plurality of terminals disposed on the busbar body,
 the busbar body includes a plurality of protrusions protruding from an upper surface of the busbar body and disposed in the first groove, and
 the plurality of protrusions are disposed on a same circular orbit based on a center of the busbar,
 wherein the busbar body includes a first busbar body and a second busbar body,
 wherein the first busbar body and the second busbar body are disposed as a multistage structure in a vertical direction,
 wherein the protrusions are disposed in empty spaces, respectively, wherein the empty spaces are formed by separating the second busbar bodies.

2. The motor of claim 1, wherein:
wherein the protrusions are disposed between the second busbar bodies separated from each other in a circumferential direction.

3. The motor of claim 1, wherein:
the protrusions are disposed on the first busbar body; and
the protrusions are disposed to overlap the second busbar body in a circumferential direction.

4. The motor of claim 1, wherein the power terminal unit includes a power terminal unit body and a plurality of power terminals disposed on the power terminal unit body,
wherein the busbar includes the first busbar body in which a first terminal is disposed and the second busbar body that is disposed on the first busbar body and in which a second terminal is disposed,
an upper surface of the first busbar body includes a plurality of first coupling parts,
a lower surface of the power terminal unit body includes a plurality of second coupling parts coupled to the first coupling parts, and
the second terminal and the plurality of power terminals are connected.

5. The motor of claim 1, comprising a housing that accommodates the stator and the busbar,
wherein the housing includes a first part disposed above the busbar,
the busbar includes at least one first support surface in contact with the first part, and
the first part includes at least one second support surface in contact with the first support surface.

6. The motor of claim 5, wherein the second support surface is disposed at a higher level than an upper surface of the body and disposed at a lower level than an upper end of the second terminal.

7. The motor of claim 5, wherein each of the protrusions includes:
a first member extending from the body; and
a second member disposed inside the first member.

8. The motor of claim 7, wherein:
an end surface of the second member is disposed at a higher level than an end surface of the first member; and
the second support surface is disposed on the end surface of the second member.

9. The motor of claim 7, wherein:
the first member is formed of a same material as the body; and
the second member is formed of a different material from the first member.

10. A motor comprising:
a shaft;
a rotor coupled to the shaft;
a stator disposed to correspond to the rotor and including a stator core and a coil;
a busbar disposed above the stator; and
a power terminal unit connected to the coil and coupled to the busbar,
wherein the power terminal unit includes protrusions,
the busbar includes a busbar body and a plurality of terminals disposed on the busbar body,
the busbar body includes a plurality of second grooves that are disposed in an upper surface of the busbar body and in which the protrusions are disposed, and
the plurality of second grooves are disposed on a same circular orbit based on a center of the busbar,
wherein the busbar body includes a first busbar body and a second busbar body,
wherein the first busbar body and the second busbar body are disposed as a multistage structure in a vertical direction, and
wherein the second grooves are disposed between the second busbar bodies separated in a circumferential direction.

11. The motor of claim 10, wherein the power terminal unit includes a power terminal unit body and a plurality of power terminals disposed on the power terminal unit body,
wherein the busbar includes the first busbar body in which a first terminal is disposed and the second busbar body that is disposed on the first busbar body and in which a second terminal is disposed,
an upper surface of the first busbar body includes a plurality of first coupling parts,
a lower surface of the power terminal unit body includes a plurality of second coupling parts coupled to the first coupling parts, and
the second terminal and the plurality of power terminals are connected.

12. The motor of claim 10, comprising a housing that accommodates the stator and the busbar,
wherein the housing includes a first part disposed above the busbar,
the busbar includes at least one first support surface in contact with the first part, and
the first part includes at least one second support surface in contact with the first support surface.

13. The motor of claim 12, wherein the second support surface is disposed at a higher level than an upper surface of the body and disposed at a lower level than an upper end of the second terminal.

14. The motor of claim 12, wherein each of the protrusions includes:
a first member extending from the body; and
a second member disposed inside the first member.

* * * * *